US012382172B2

(12) United States Patent
Teng et al.

(10) Patent No.: US 12,382,172 B2
(45) Date of Patent: Aug. 5, 2025

(54) MULTI-LENS VIDEO RECORDING METHOD AND RELATED DEVICE

(71) Applicant: HUAWEI TECHNOLOGIES CO., LTD., Guangdong (CN)

(72) Inventors: Fei Teng, Shenzhen (CN); Junkai Chen, Shenzhen (CN); Zhaolei Xiao, Shenzhen (CN); He Wei, Shenzhen (CN); Changqi Hu, Shenzhen (CN); Zhijie Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 18/189,319

(22) Filed: Mar. 24, 2023

(65) Prior Publication Data
US 2023/0247293 A1 Aug. 3, 2023

Related U.S. Application Data

(63) Continuation of application No. PCT/CN2021/104116, filed on Jul. 1, 2021.

(30) Foreign Application Priority Data

Sep. 27, 2020 (CN) .......................... 202011037347.5

(51) Int. Cl.
H04N 23/68 (2023.01)
H04N 5/265 (2006.01)
H04N 23/61 (2023.01)
H04N 23/667 (2023.01)
H04N 23/95 (2023.01)

(52) U.S. Cl.
CPC ........... *H04N 23/683* (2023.01); *H04N 5/265* (2013.01); *H04N 23/61* (2023.01); *H04N 23/667* (2023.01); *H04N 23/681* (2023.01); *H04N 23/95* (2023.01)

(58) Field of Classification Search
None
See application file for complete search history.

(56) References Cited

U.S. PATENT DOCUMENTS

2009/0324191 A1* 12/2009 Reusens ................. H04N 5/265
348/584
2020/0092495 A1 3/2020 Siau et al.

FOREIGN PATENT DOCUMENTS

| CN | 103391403 B | 8/2017 |
| CN | 109409321 A | 3/2019 |
| CN | 110266957 A | 9/2019 |
| CN | 110691210 A | 1/2020 |

(Continued)

OTHER PUBLICATIONS

Extended European Search Report issued in EP21870933.5, dated Feb. 6, 2024, 12 pages.

*Primary Examiner* — James M Hannett

(57) ABSTRACT

A multi-lens video recording method and a main control device are disclosed. The method includes: performing collaborative photographing through a plurality of cameras, determining a target camera movement mode based on main subject information in images obtained through photographing and motion information of the cameras, and then fusing, based on the target camera movement mode, the images obtained through photographing by using the plurality of cameras, to implement online camera movement fusion on the plurality of video stream images.

18 Claims, 11 Drawing Sheets

(56) References Cited

FOREIGN PATENT DOCUMENTS

CN         111083380 A     4/2020
WO     2018116322 A1   6/2018

* cited by examiner

MULTI-LENS VIDEO RECORDING METHOD AND RELATED DEVICE

CROSS-REFERENCE TO RELATED APPLICATIONS

This application is a continuation of International Application No. PCT/CN2021/104116, filed on Jul. 1, 2021, which claims priority to Chinese Patent Application No. 202011037347.5, filed on Sep. 27, 2020. The disclosures of the aforementioned applications are hereby incorporated by reference in their entireties.

TECHNICAL FIELD

The present disclosure relates to the field of video recording, and in particular, to a multi-lens video recording method and related devices.

BACKGROUND

Using video to record life, exchange experience, show talent, and sell goods is a very typical socializing way at present. In terms of forms, videos include, but not limited to, a short video, a micro video, a micro movie, a vlog, a video embedded in a web page, a GIF image, and the like. To create a high-quality video with good imaging quality, a prominent theme, a clean background, and harmonious camera movement, first, expensive professional devices such as a single-lens reflex camera, a mirrorless camera, a handheld stabilizer, and a recording microphone are required. Second, it is necessary to write a script and clarify a story line in an early stage of photographing. In addition, it is necessary to use professional techniques to improve expressiveness of content in a photographing process. Finally, it is necessary to perform complex editing works in a later stage of photographing. It can be seen that the consumption of manpower, material resources, costs, and time is huge. In recent years, basic imaging quality of mobile phones has been greatly improved in terms of image quality, anti-shake, and focusing, and creating and sharing videos by using the mobile phones has become a new trend. Popular mobile video production software such as Blockbuster/Flash/Cat pie belongs to a later-stage offline editing mode and mainly implements functions such as filter/transition/music background for a pre-collected video source by using a template.

On the other hand, with improvement of software and hardware capabilities of mobile phone chips and cameras, use of a plurality of cameras to improve basic video quality becomes an essential highlight at a conference of major mobile phone manufacturers. An application of Filmic Pro of iphone 11 Pro supports simultaneous recording of a wide-angle lens, an ultra-wide-angle lens, a telephoto lens, and a front-facing lens, previews a video in plurality of windows, and stores a plurality of video streams. Huawei P30 Pro/Mate 30 Pro and other models have a Dual View recording function, support simultaneous recording of a wide-angle lens/a telephoto lens, and preview and store a video in a form of two squares. It can be seen that neither the existing mobile video production software nor the existing mainstream simultaneous video recording of a plurality of cameras can meet wide requirements of users for creating a high-quality video with harmonious camera movement online by using mobile phones.

SUMMARY

Embodiments of the present disclosure provide a multi-lens video recording method and related devices. A target camera movement mode is determined based on main subject information in a plurality of first images captured by a first camera and motion information of the first camera, and then the plurality of first images and a plurality of second images captured by a second camera are fused based on the target camera movement mode, to obtain a target video. In the present disclosure, instead of performing output after image frames of each video stream are subject to simple transition or sorting, a video having characteristics of a prominent subject, a clean background, and smooth transition is outputted after the image frames of each video stream are edited, modified, and fused by combining the main subject information and the motion information, to help a user create a high-quality video with good imaging quality and harmonious camera movement online through a mobile phone for subsequent sharing.

According to a first aspect, an embodiment of the present disclosure provides a multi-lens video recording method, including:

obtaining a plurality of first images and a plurality of second images, where the plurality of first images and the plurality of second images are respectively obtained through photographing a same photographed object by using a first camera and a second camera, and a parameter of the first camera is different from a parameter of the second camera; obtaining motion information of the first camera in a process of obtaining the plurality of first images through photographing; obtaining main subject information in each of the plurality of first images; determining a target camera movement mode based on the motion information of the first camera and the main subject information in each of the plurality of first images; and fusing the plurality of first images and the plurality of second images based on the target camera movement mode, to obtain a target video, where a camera movement effect of the target video is the same as a camera movement effect of a video obtained in the target camera movement mode.

That the parameter of the first camera is different from the parameter of the second camera specifically includes:

a field of view (FOV) of the first camera is greater than an FOV of the second camera, or a focal length of the first camera is less than a focal length of the second camera.

Optionally, the first camera may be a wide-angle camera or a primary camera, and the second camera may be a primary camera or a telephoto camera.

Through collaborative photographing of a plurality of cameras, a target camera movement mode is determined based on main subject information in images obtained through photographing and motion information of the cameras, and then the images obtained through photographing by using the plurality of cameras are fused based on the target camera movement mode, to implement online camera movement fusion on a plurality of video stream images instead of performing simple transition or sorting on image frames of each video stream.

With reference to the first aspect and any one of the foregoing possible implementations, the determining a target camera movement mode based on the motion information of the first camera and the main subject information in each of the plurality of first images includes:

determining, based on the motion information of the first camera, whether the first camera is displaced in the process of obtaining the plurality of first images through photographing; determining, when it is determined that the first camera is not displaced, the target camera movement mode based on the main subject information in each of the plurality of first images; and determining, when it is determined that the first camera is displaced, the target camera movement mode based on a motion manner of the first camera and the main subject information in each of the plurality of first images.

An appropriate camera movement mode is selected depending on determining whether the first camera moves in a process of obtaining the plurality of first images through photographing, to provide a basis for subsequently obtaining a high-quality video with harmonious camera movement.

With reference to the first aspect and any one of the foregoing possible implementations, the determining a target camera movement mode based on the main subject information in each of the plurality of first images includes:

determining the target camera movement mode as a push-in lens when the main subject information in each of the plurality of first images indicates that each of the plurality of first images includes a main subject, and a first ratio of each of the plurality of first images is less than a first preset ratio, where the first ratio of each first image is a ratio of an area of a region of interest (ROI) in which the main subject in the first image is located to an area of the first image; or the first ratio of each first image is a ratio of a width of an ROI in which the main subject in the first image is located to a width of the first image; or the first ratio of each first image is a ratio of a height of an ROI in which the main subject in the first image is located to a height of the first image; and determining the target camera movement mode as a pull-out lens when the main subject information in each of the plurality of first images indicates that a default ROI region in each first image does not include the main subject, and an image in the default ROI in each first image is a part of the first image.

Optionally, the default ROI may be a central region or another region in the first image.

When it is determined that the first camera is stationary, the target camera movement mode is further determined based on the main subject information in the first images captured by the first camera, to provide a basis for subsequently obtaining a high-quality video with a prominent subject and harmonious camera movement.

With reference to the first aspect and any one of the foregoing possible implementations, the determining the target camera movement mode based on a motion manner of the first camera and the main subject information in each of the plurality of first images includes:

determining the target camera movement mode as a traveling lens when the motion manner of the first camera indicates that the first camera moves in a same direction when obtaining the plurality of first images through photographing, and the main subject information in each of the plurality of first images indicates that main subjects in the plurality of first images change; determining the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and determining the target camera movement mode as a follow lens when the motion manner of the first camera indicates that the first camera moves when obtaining the plurality of first images through photographing, and the main subject information in each of the plurality of first images indicates that the main subjects in the plurality of first images do not change.

When it is determined that the first camera is moving, the target camera movement mode is further determined based on the main subject information in the first images captured by the first camera and a motion manner of the first camera, to provide a basis for subsequently obtaining the high-quality video with harmonious camera movement.

With reference to the first aspect and any one of the foregoing possible implementations, when the target camera movement mode is the push-in lens or the pull-out lens, the fusing the plurality of first images and the plurality of second images based on the target camera movement mode, to obtain a target video includes:

obtaining a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtaining a plurality of first image pairs from the plurality of first images and the plurality of second images, where each of the plurality of first image pairs includes a first image and a second image that have a same timestamp; obtaining a plurality of first target images from the plurality of first image pairs, where the plurality of first target images are in a one-to-one correspondence with the plurality of first image pairs, and each of the plurality of first target images is an image that has a smallest viewing angle range in a corresponding first image pair and that includes a preset region in the first image; cutting each of the plurality of first target images to obtain a part that overlaps an image in a preset region in a first image in a second image pair to which the first target image belongs, to obtain a plurality of third images; and processing each of the plurality of third images to obtain a plurality of processed third images, where a resolution of each of the plurality of processed third images is a preset resolution, and the target video includes the plurality of processed third images.

It should be noted herein that the size of the preset region in the first image may be a pixel area of the preset region in the first image, or a ratio of the preset region to the first image, or a height and a width of the preset region.

It should be noted herein that, in the present disclosure, a timestamp of an image is a time at which a camera obtains the image through photographing.

When it is determined that the target camera movement mode is the push-in lens or the pull-out lens, the first images and the second images are fused to obtain a target video with a prominent object and smooth transition, to help the user create a high-quality video with good imaging quality, a prominent subject, and harmonious camera movement online through a mobile phone for subsequent sharing.

With reference to the first aspect and any one of the foregoing possible implementations, when the target camera movement mode is the traveling lens, the panning lens, or the follow lens, the fusing the plurality of first images and the plurality of second images based on the target camera movement mode, to obtain a target video includes:

performing subject detection and extraction on the plurality of first images to obtain an ROI in each of the plurality of first images, and cutting the ROI in each of the plurality of first images to obtain a plurality of fourth images, where each of the plurality of fourth images includes a main subject; and the plurality of first images are in a one-to-one correspondence with the plurality of fourth images, and a timestamp of each of the plurality of fourth images is the same as a timestamp of a first image corresponding to the fourth image; processing each of the plurality of fourth images to obtain a plurality of fifth images, where a resolution of each of the plurality of fifth images is a preset resolution; and the plurality of fourth images are in a one-to-one correspondence with the plurality of fifth images, and a timestamp of each of the plurality of fifth images is the same as a timestamp of a fourth image corresponding to the fifth image; obtaining a plurality of second image pairs from the plurality of second images and the plurality of fifth images, where each of the plurality of second image pairs includes a fifth image and a second image that have a same timestamp; and obtaining a plurality of second target images from the plurality of second image pairs, where the plurality of second target images are in a one-to-one correspondence with the plurality of image pairs; for each of the plurality of second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the second target image corresponding to the image pair is the fifth image; and the target video includes the plurality of second target images.

When it is determined that the target camera movement mode is the follow lens, the traveling lens, or the panning lens, the first images and the second images are fused to obtain the target video with the prominent subject and smooth transition, to help the user create a high-quality video with good imaging quality, a prominent subject, and harmonious camera movement online through a mobile phone for subsequent sharing.

With reference to the first aspect and any one of the possible implementations, the method in the present disclosure further includes:
  displaying an image captured by the first camera, an image captured by the second camera, and the target video on a display interface, where
  the display interface includes a first region, a second region, and a third region, the first region displays the image captured by the first camera, the second region is used to display the image captured by the second camera, and the third region is used to display the target video.

The first images, the second images, and the target video are displayed on the display interface in real time, so that a photographing status of each camera and a visual effect of the target video can be observed in real time, and a user can adjust photographing angles or positions of the first camera and the second camera in real time, to obtain a video with a more ideal camera movement effect.

Further, the first region includes a fourth region, and the fourth region is used to display an overlapping part between the image captured by the first camera and the image captured by the second camera.

With reference to the first aspect and any one of the foregoing possible implementations, the fusing the plurality of first images and the plurality of second images based on the target camera movement mode, to obtain a target video includes:
  fusing the plurality of first images, the plurality of second images, and a plurality of sixth images based on the target camera movement mode, to obtain the target video, where the sixth image is obtained through photographing the photographed object by using a third camera, a parameter of the third camera is different from the parameter of the first camera, and the parameter of the third camera is different from the parameter of the second camera.

The FOV of the first camera is greater than the FOV of the second camera, and an FOV of the third camera is greater than the FOV of the second camera and less than the FOV of the first camera; or the focal length of the first camera is less than the focal length of the second camera, and a focal length of the third camera is greater than the focal length of the second camera. For example, the first camera is a wide-angle camera, the second camera is a telephoto camera, and the third camera is a primary camera.

With reference to the first aspect and any one of the foregoing possible implementations, when the target camera movement mode is the push-in lens or the pull-out lens, the fusing the plurality of first images, the plurality of second images, and a plurality of sixth images based on the target camera movement mode, to obtain the target video includes:
  obtaining a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtaining a plurality of third image pairs from the plurality of first images, the plurality of second images, and the plurality of sixth images, where each of the plurality of third image pairs includes a first image, a second image, and a sixth image that have a same timestamp; obtaining a plurality of third target images from the plurality of third image pairs, where the plurality of third target images are in a one-to-one correspondence with the plurality of third image pairs, and each of the plurality of third target images is an image that has a smallest viewing angle range in a corresponding third image pair and that includes a preset region in the first image; cutting each of the plurality of third target images to obtain a part that overlaps an image in a preset region in a first image in a third image pair to which the third target image belongs, to obtain a plurality of seventh images; and processing each of the plurality of seventh images to obtain a plurality of eighth images, where a resolution of each of the plurality of eighth images is a preset resolution, and the target video includes the plurality of eighth images.

The third image is introduced based on the first image and the second image for fusion, so that a video with better imaging quality can be obtained.

With reference to the first aspect and any one of the foregoing possible implementations, when the target camera movement mode is the follow lens, the traveling lens, or the panning lens, the fusing the plurality of first images, the plurality of second images, and a plurality of sixth images based on the target camera movement mode, to obtain the target video includes:

performing subject detection and extraction on the plurality of first images to obtain an ROI in each of the plurality of first images; obtaining a plurality of fourth image pairs from the plurality of first images, the plurality of second images, and the plurality of sixth images, where each of the plurality of fourth image pairs includes a first image, a second image, and a sixth image that have a same timestamp; obtaining a plurality of fourth target images from the plurality of fourth image pairs, where the plurality of fourth target images are in a one-to-one correspondence with the plurality of fourth image pairs, and each of the plurality of fourth target images is an image that has a smallest viewing angle range in a corresponding fourth image pair and that includes an ROI in the first image; cutting each of the plurality of fourth target images to obtain a part that overlaps an image in an ROI in a first image in a fourth image pair to which the fourth target image belongs, to obtain a plurality of ninth images; and processing each of the plurality of ninth images to obtain a plurality of tenth images, where a resolution of each of the plurality of tenth images is a preset resolution, and the target video includes the plurality of tenth images.

The third image is introduced based on the first image and the second image for fusion, so that a video with better imaging quality can be obtained.

With reference to the first aspect and any one of the possible implementations, the method in the present disclosure further includes:

displaying an image captured by the first camera, an image captured by the second camera, an image captured by the third camera, and the target video on a display interface, where the display interface includes a first region, a second region, and a third region, the first region includes a fifth region, and the fifth region includes a fourth region; and the first region displays the image captured by the first camera, the second region is used to display the image captured by the second camera, the third region is used to display the target video, the fourth region is used to display an overlapping part between the image captured by the first camera and the image captured by the second camera, and the fifth region is used to display an overlapping part between the image captured by the second camera and the image captured by the third camera.

The first images, the second images, the third images, and the target video are displayed on the display interface in real time, so that a photographing status of each camera and a visual effect of the target video can be observed in real time, and the user can adjust photographing angles or positions of the first camera, the second camera, and the third camera in real time, to obtain a video with a more ideal camera movement effect.

According to a second aspect, an embodiment of the present disclosure provides a main control device, including:

an obtaining unit, configured to obtain a plurality of first images and a plurality of second images, where the plurality of first images and the plurality of second images are respectively obtained through photographing a same photographed object by using a first camera and a second camera, and a parameter of the first camera is different from a parameter of the second camera; and obtain motion information of the first camera in a process of obtaining the plurality of first images through photographing;

the obtaining unit being further configured to obtain main subject information in each of the plurality of first images;

a determining unit, configured to determine a target camera movement mode based on the motion information of the first camera and the main subject information in each of the plurality of first images; and a fusion unit, configured to fuse the plurality of first images and the plurality of second images based on the target camera movement mode, to obtain a target video, where a camera movement effect of the target video is the same as a camera movement effect of a video obtained in the target camera movement mode.

Optionally, that the parameter of the first camera is different from the parameter of the second camera specifically includes:

an FOV of the first camera is greater than an FOV of the second camera, or a focal length of the first camera is less than a focal length of the second camera.

With reference to the second aspect, the determining unit is further configured to:

determine, based on the motion information of the first camera, whether the first camera is displaced in the process of obtaining the plurality of first images through photographing; determine, when it is determined that the first camera is not displaced, the target camera movement mode based on the main subject information in each of the plurality of first images; and determine, when it is determined that the first camera is displaced, the target camera movement mode based on a motion manner of the first camera and the main subject information in each of the plurality of first images.

With reference to the second aspect and any one of the foregoing possible implementations, in an aspect of determining the target camera movement mode based on a motion manner of the first camera and the main subject information in each of the plurality of first images, the determining unit is further configured to:

determine the target camera movement mode as a push-in lens when the main subject information in each of the plurality of first images indicates that each of the plurality of first images includes a main subject, and a first ratio of each of the plurality of first images is less than a first preset ratio, where the first ratio of each first image is a ratio of an area of a region of interest (ROI) in which the main subject in the first image is located to an area of the first image; or the first ratio of each first image is a ratio of a width of an ROI in which the main subject in the first image is located to a width of the first image; or the first ratio of each first image is a ratio of a height of an ROI in which the main subject in the first image is located to a height of the first image; and determine the target camera movement mode as a pull-out lens when the main subject information in each of the plurality of first images indicates that a default ROI region in each first image does not include the main subject, and an image in the default ROI in each first image is a part of the first image.

With reference to the second aspect and any one of the foregoing possible implementations, in an aspect of determining the target camera movement mode based on a motion manner of the first camera and the main subject information in each of the plurality of first images, the determining unit is further configured to:

determine the target camera movement mode as a traveling lens when the motion manner of the first camera indicates that the first camera moves in a same direction when obtaining the plurality of first images through photographing, and the main subject information in each of the plurality of first images indicates that main subjects in the plurality of first images change;

determine the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and determine the target camera movement mode as a follow lens when the motion manner of the first camera indicates that the first camera moves when obtaining the plurality of first images through photographing, and the main subject information in each of the plurality of first images indicates that the main subjects in the plurality of first images do not change.

With reference to the second aspect and any one of the foregoing possible implementations, when the target camera movement mode is the push-in lens or the pull-out lens, the fusion unit is further configured to:

obtain a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtain a plurality of first image pairs from the plurality of first images and the plurality of second images, where each of the plurality of first image pairs includes a first image and a second image that have a same timestamp; obtain a plurality of first target images from the plurality of first image pairs, where the plurality of first target images are in a one-to-one correspondence with the plurality of first image pairs, and each of the plurality of first target images is an image that has a smallest viewing angle range in a corresponding first image pair and that includes a preset region in the first image; cut each of the plurality of first target images to obtain a part that overlaps an image in a preset region in a first image in a second image pair to which the first target image belongs, to obtain a plurality of third images; and process each of the plurality of third images to obtain a plurality of processed third images, where a resolution of each of the plurality of processed third images is a preset resolution, and the target video includes the plurality of processed third images.

With reference to the second aspect and any one of the foregoing possible implementations, when the target camera movement mode is the traveling lens, the panning lens, or the follow lens, the fusion unit is further configured to:

perform subject detection and extraction on the plurality of first images to obtain an ROI in each of the plurality of first images, and cut the ROI in each of the plurality of first images to obtain a plurality of fourth images, where each of the plurality of fourth images includes a main subject; and the plurality of first images are in a one-to-one correspondence with the plurality of fourth images, and a timestamp of each of the plurality of fourth images is the same as a timestamp of a first image corresponding to the fourth image; process each of the plurality of fourth images to obtain a plurality of fifth images, where a resolution of each of the plurality of fifth images is a preset resolution; and the plurality of fourth images are in a one-to-one correspondence with the plurality of fifth images, and a timestamp of each of the plurality of fifth images is the same as a timestamp of a fourth image corresponding to the fifth image; obtain a plurality of second image pairs from the plurality of second images and the plurality of fifth images, where each of the plurality of second image pairs includes a fifth image and a second image that have a same timestamp; and obtain a plurality of second target images from the plurality of second image pairs, where the plurality of second target images are in a one-to-one correspondence with the plurality of image pairs; for each of the plurality of second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the second target image corresponding to the image pair is the fifth image; and the target video includes the plurality of second target images.

With reference to the second aspect and any one of the foregoing possible implementations, the device further includes:

a display unit, configured to display an image captured by the first camera, an image captured by the second camera, and the target video, where an interface displayed by the display unit includes a first region, a second region, and a third region, the first region displays the image captured by the first camera, the second region is used to display the image captured by the second camera, the third region is used to display the target video, and a field of view (FOV) of the first camera is greater than an FOV of the second camera.

Optionally, the first camera is a wide-angle camera or a primary camera, and the second camera is a telephoto camera or a primary camera.

Further, the first region includes a fourth region, and the fourth region is used to display an overlapping part between the image captured by the first camera and the image captured by the second camera.

With reference to the first aspect and any one of the foregoing possible implementations, the fusion unit is further configured to:

fuse the plurality of first images, the plurality of second images, and a plurality of sixth images based on the target camera movement mode, to obtain the target video, where the sixth image is obtained through photographing the photographed object by using a third camera, a parameter of the third camera is different from the parameter of the first camera, and the parameter of the third camera is different from the parameter of the second camera.

With reference to the second aspect and any one of the foregoing possible implementations, when the target camera movement mode is the push-in lens or the pull-out lens, the fusion unit is further configured to:

obtain a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtain a plurality of third image pairs from the plurality of first images, the plurality of second images, and the plurality of sixth images, where each of the plurality of third image pairs includes a first image, a second image, and a sixth image that have a same timestamp; obtain a plurality of third target images from the plurality of third image pairs, where the plurality of third target images are in a one-to-one correspondence with the plurality of third image pairs, and each of the plurality of third target images is an image that has a smallest viewing angle range in a corresponding third image pair and that includes a preset region in the first image; cut each of the plurality of third target images to obtain a part that overlaps an image in a preset region in a first image in a third image pair to which the third target image belongs, to obtain a plurality of seventh images; and process each of the plurality of seventh images to obtain a plurality of eighth images, where a resolution of each of the plurality of eighth images is a preset resolution, and the target video includes the plurality of eighth images.

With reference to the second aspect and any one of the foregoing possible implementations, when the target camera movement mode is the follow lens, the traveling lens, or the panning lens, the fusion unit is further configured to:

perform subject detection and extraction on the plurality of first images to obtain an ROI in each of the plurality of first images; obtain a plurality of fourth image pairs from the plurality of first images, the plurality of second images, and the plurality of sixth images, where each of the plurality of fourth image pairs includes a first image, a second image, and a sixth image that have a same timestamp; obtain a plurality of fourth target images from the plurality of fourth image pairs, where the plurality of fourth target images are in a one-to-one correspondence with the plurality of fourth image pairs, and each of the plurality of fourth target images is an image that has a smallest viewing angle range in a corresponding fourth image pair and that includes an ROI in the first image; cut each of the plurality of fourth target images to obtain a part that overlaps an image in an ROI in a first image in a fourth image pair to which the fourth target image belongs, to obtain a plurality of ninth images; and process each of the plurality of ninth images to obtain a plurality of tenth images, where a resolution of each of the plurality of tenth images is a preset resolution, and the target video includes the plurality of tenth images.

With reference to the second aspect and any one of the foregoing possible implementations, the main control device further includes:

a display unit, configured to display an image captured by the first camera, an image captured by the second camera, an image captured by the third camera, and the target video, where the FOV of the first camera is greater than the FOV of the second camera, and an FOV of the third camera is greater than the FOV of the second camera and less than the FOV of the first camera; and an interface displayed by the display unit includes a first region, a second region, and a third region, the first region includes a fifth region, and the fifth region includes a fourth region, the first region displays the image captured by the first camera, the second region is used to display the image captured by the second camera, the third region is used to display the target video, and the fourth region is used to display an overlapping part between the image captured by the first camera and the image captured by the second camera; and the fifth region is used to display an overlapping part between the image captured by the second camera and the image captured by the third camera.

According to a third aspect, an embodiment of the present disclosure provides an electronic device, including a touchscreen, a memory, and one or more processors, where one or more programs are stored in the memory, and when the one or more processors execute the one or more programs, the electronic device is enabled to implement a part or all of the method in the first aspect.

According to a fourth aspect, an embodiment of the present disclosure provides a computer storage medium, including computer instructions, where when the computer instructions run on an electronic device, the electronic device is enabled to perform a part or all of the method in the first aspect.

According to a fifth aspect, an embodiment of the present disclosure provides a computer program product, where when the computer program product runs on a computer, the computer is enabled to perform a part or all of the method in the first aspect.

In the solutions of embodiments of the present disclosure, a target camera movement mode is determined based on main subject information in images captured by a first camera and motion information of the camera, and then images captured by a plurality of cameras (which include the first camera, the second camera, and the like) are fused based on the target camera movement mode, to obtain a target video having a visual effect of a video obtained in the target camera movement mode. In the present disclosure, instead of performing output after image frames of each video stream are subject to simple transition or sorting, a video having characteristics of a prominent subject, a clean background, and smooth transition is outputted after the image frames of each video stream are edited, modified, and fused by combining the main subject information and the motion information, to help a user create a high-quality video with good imaging quality, the prominent subject, the clean background, and harmonious camera movement online through a mobile phone for subsequent sharing.

It should be understood that any one of the foregoing possible implementations may be freely combined on a premise of not violating a natural law.

It should be understood that, descriptions of technical features, technical solutions, beneficial effect, or similar words in the present disclosure do not imply that all features and advantages can be implemented in any individual embodiment. On the contrary, it may be understood that, the descriptions of the features or the beneficial effect mean that at least one embodiment includes a specific technical feature, technical solution, or beneficial effect. Therefore, the descriptions of the technical features, the technical solutions, or the beneficial effect in this specification may not necessarily be specific to a same embodiment. Further, the technical features, the technical solutions, and the beneficial effect described in embodiments may be combined in any proper manner. A person skilled in the art may understand that an embodiment may be implemented without one or more specific technical features or technical solutions, or beneficial effect in a specific embodiment. In other embodiments, additional technical features and beneficial effects may be further identified in a particular embodiment that does not embody all embodiments.

DESCRIPTION OF EMBODIMENTS

Figure 1A:
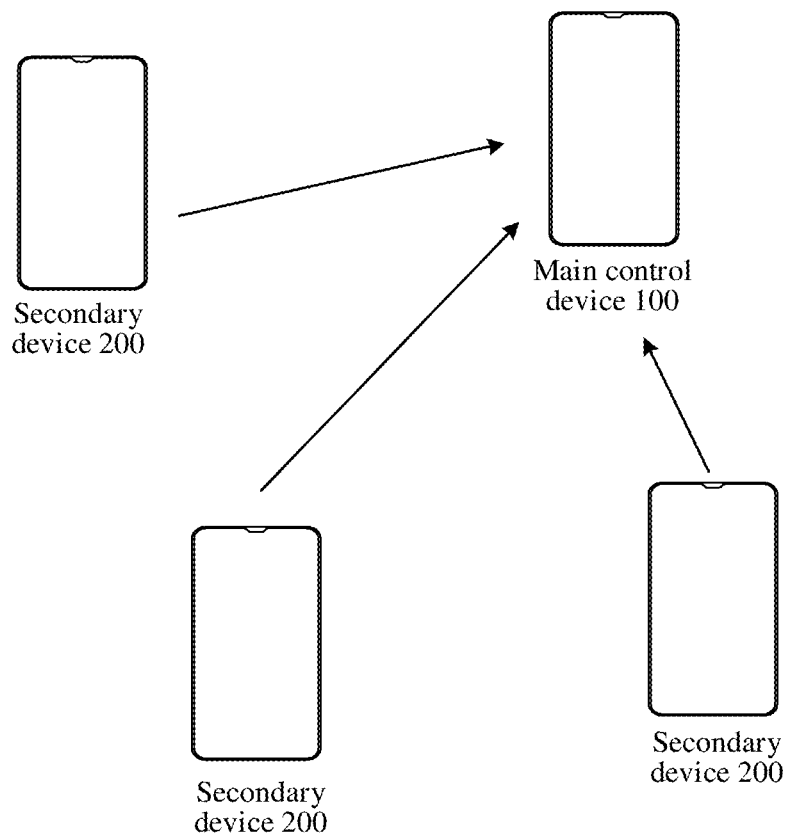
FIG. 1a is a schematic diagram of an application scenario according to an embodiment of the present disclosure.

The following clearly describes technical solutions in embodiments of the present disclosure in detail with reference to the accompanying drawings.

First, a camera movement mode is described.

Push-in lens: A lens that slowly moves forward or quickly moves forward without changing a position of a photographed object, where a shotsize is changed from a long shot to a full shot, a medium shot, a close shot, or even a close-up, which may be considered as that an FOV of the lens is gradually reduced, or a focal length gradually increases. The lens is mainly used to highlight a subject, so that a visual attention of an audience is gradually concentrated, and a visual sense is enhanced, to form a state of examination.

Pull-out lens: A lens that moves backward from near to far to leave a photographed object with a movement direction opposite to that of the push-in lens, where a framing range is changed from small to large, the photographed object is changed from large to small, and a distance to the audience also gradually increases. Scenes in a picture increase and are changed from a part to a whole. A shotsize is changed from a close-up, a close shot, or a medium shot to a full shot or a long shot. It may be considered as that an FOV of the lens gradually increases, or a focal length of the lens is gradually reduced. The pull-out lens is mainly used to explain an environment in which a person is located.

Panning lens: A lens for photographing a continuous action or a mega scene. The panning lens has a small angle and a constant speed, and a camera does not move and enables a photographic lens to rotate up and down, left and right, and even around for photographing with help of a movable chassis, which likes eyes of a person for patrolling the photographed object in a specific direction. The panning lens can represent eyes of a person to look at everything surrounding. It has a unique role in describing space and environment. The pan is often used to introduce a big scene, and the tilt is often used to show the grand and the steepness of a tall object.

Traveling lens: A lens that moves horizontally to expand a field of view, and moves horizontally to the left and right to perform photographing, which is similar to a state of people walking and watching in life. The traveling lens has an imaging ability of expanding two-dimensional space of a screen as the panning lens, but because the machine is not fixed, the traveling lens has greater freedom than the panning lens and can break a limitation of an image to expand the space.

Follow lens: A moving shot, a variant of the traveling lens, that follows a photographed object at a same distance. The follow lens always follows a traveling subject, has a strong sense of traveling through space, and is suitable for continuously showing a movement, an expression, or a detail of a character.

Whip pan or tilt: A lens that performs fast transition between static pictures, to make an image blur and become an optical flow.

Second, an application scenario of the present disclosure is described.

A main control device 100 acquires a first video stream and a second video stream respectively through a first camera and a second camera, where the first video stream includes a plurality of first images, and the second video stream includes a plurality of second images; and then the main control device 100 fuses the first video stream and the second video stream based on the method in the present disclosure, to obtain a target video, where the target video is a video stream having different camera movement effects or special effects. Optionally, the main control device 100 further obtains a third video stream through a third camera, where the third video stream includes a plurality of fifth images; and then the main control device 100 fuses the first video stream, the second video stream, and the third video stream based on the method in the present disclosure, to obtain the target video. The video streams captured by the cameras and the target video are displayed on a display interface of the main control device 100. The first video stream, the second video stream, and the third video stream are respectively video streams obtained through photographing a same photographed object by using the first camera, the second camera, and the third camera.

The first camera includes a wide-angle camera, a primary camera, or a front-facing camera. The second camera includes a telephoto camera or a primary camera. The first camera and the second camera are different.

When the main control device 100 includes only the first camera, the second camera, or the third camera, or the main control device 100 does not include the first camera, the second camera, and the third camera, the main control device 100 and one or more secondary devices 200 form a network. As shown in FIG. 1*a*, the main control device 100 obtains, from the plurality of secondary devices 200, a first video stream and a second video stream that are required by the main control device. Optionally, the main control device 100 further obtains a third video stream from the secondary devices 200. For example, the main control device 100 does not include the first camera and the second camera, a secondary device A of the plurality of secondary devices 200 includes the first camera, and a secondary device B includes the second camera. Optionally, the main control device 100 does not include the third camera, and a secondary device C includes the third camera. The main control device 100 can obtain a first video stream captured by the first camera from the secondary device A, and obtain a second video stream captured by the second camera from the secondary device B; and optionally, obtain the third video stream captured by the third camera from the secondary device C. For another example, the main control device 100 includes the first camera and the third camera, and the secondary devices 200 include the second camera. The main control device 100 obtains the first video stream through the first camera, and obtains the second video stream captured by the second camera from the secondary devices 200. The main control device 100 fuses the first video stream and the second video stream based on the method in the present disclosure, to obtain the target video. For example, the main control device 100 includes the first camera and the third camera, and the secondary devices 200 include the second camera. The main control device 100 obtains the first video stream and the third video stream respectively through the first camera and the third camera, and obtains the second video stream captured by the second camera from the secondary devices 200. The main control device 100 fuses the first video stream, the second video stream, and the third video stream based on the method in the present disclosure, to obtain the target video. The target video is a video stream having different camera movement effects or special effects.

Figure 1B:
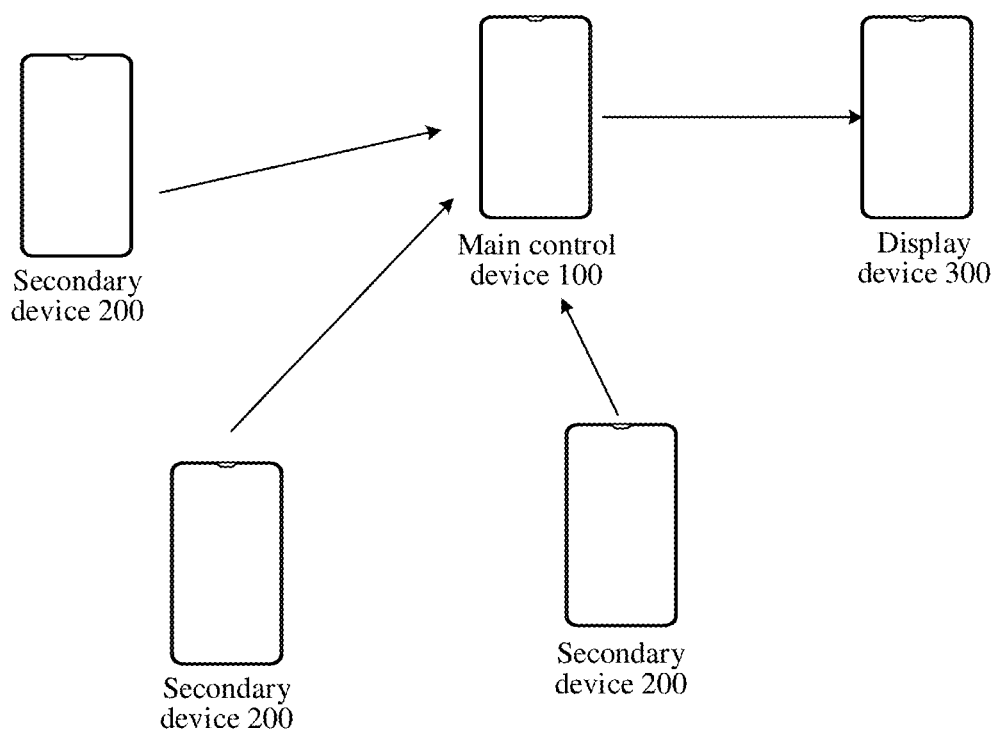
FIG. 1b is a schematic diagram of an application scenario according to an embodiment of the present disclosure.

Optionally, after obtaining the target video, the main control device 100 may display the target video on a display screen of the main control device 100, or may display the target video on a display device 30, as shown in FIG. 1*b*.

It should be noted herein that, in a process of obtaining the first video stream through the first camera, a device including the first camera may be moving or stationary. Optionally, in a process of obtaining the second video stream through the second camera, a device including the second camera may be moving or stationary. Optionally, in a process of obtaining the third video stream through the third camera, a device including the second camera may be moving or stationary.

Figure 2A:
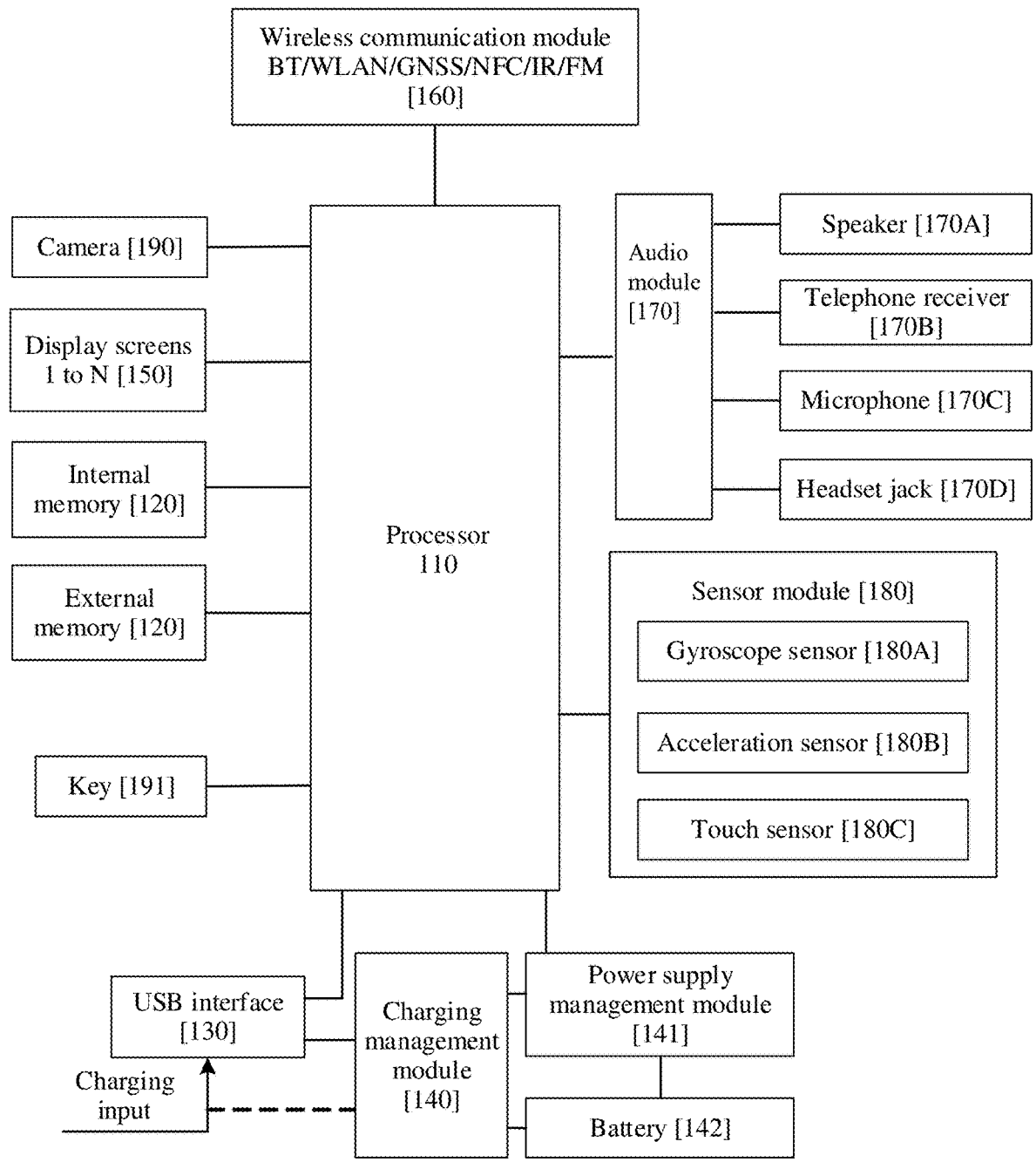
FIG. 2a is a schematic diagram of a structure of a main control device.

The following describes related structures of the foregoing electronic devices (that is, the main control device 100 and the secondary devices 200). FIG. 2*a* is a schematic diagram of a structure of the main control device 100.

It should be understood that the main control device 100 may have more or fewer components than those shown in the figure, may combine two or more components, or may have different component configurations. Components shown in the figure may be implemented by hardware including one or more signal processing and/or application-specific integrated circuits, software, or a combination of hardware and software.

The main control device 100 may include: a processor 110, an external memory interface 120, an internal memory 121, a universal serial bus (USB) interface 130, a charging management module 140, a power supply management module 141, a battery 142, a wireless communication module 160, an audio module 170, a speaker 170A, a telephone receiver 170B, a microphone 170C, a headset jack 170D, a sensor module 180, a camera 190, a key, a display screen 150, and the like. The sensor module 180 includes a gyroscope sensor 180A and an acceleration sensor 180B.

It may be understood that the structure shown in this embodiment constitutes no specific limitation on the main control device 100. In some other embodiments of the present disclosure, the main control device 100 may include more or fewer components than those shown in the figure, or have some components combined, or have some components split, or have a different component arrangement. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors.

The controller may be a nerve center and a command center of the main control device 100. The controller may generate an operation control signal based on an instruction operation code and a time sequence signal, to complete control of instruction reading and instruction execution.

A memory may be further disposed in the processor 110, and is configured to store instructions and data. In some embodiments, the memory in the processor 110 is a cache memory. The memory may store instructions or data that has been used or cyclically used by the processor 110. If the processor 110 needs to use the instruction or the data again, the processor 110 may directly invoke the instruction or the data from the memory. This avoids repeated access, reduces waiting time of the processor 110, and improves system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

It may be understood that an interface connection relationship between the modules shown in this embodiment is merely an example for description, and constitutes no limitation on the structure of the main control device 100. In some other embodiments of the present disclosure, the main control device 100 may alternatively use an interface connection manner different from that in the foregoing embodiment, or a combination of a plurality of interface connection manners.

The charging management module 140 is configured to receive a charging input from a charger. The charger may be a wireless charger or a wired charger.

The power supply management module 141 is configured to connect to the battery 142, the charging management module 140, and the processor 110. The power supply management module 141 receives input of the battery 142 and/or the charging management module 140, to supply power to the processor 110, the internal memory 121, an external memory, the display screen 150, the camera 190, the wireless communication module 160, and the like.

A wireless communication function of the main control device 100 may be implemented by using an antenna 1, an antenna 2, a wireless communication module 160, the wireless communication module 160, the modem processor, the baseband processor, and the like.

The main control device 100 implements a display function by using the GPU, the display screen 150, the application processor, and the like. The GPU is a microprocessor for image processing, and is connected to the display screen 150 and the application processor. The GPU is configured to perform mathematical and geometric computation, and render an image. The processor 110 may include one or more GPUs, which execute program instructions to generate or change display information.

The display screen 150 is configured to display an image, a video, and the like. The display screen 150 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the main control device 100 may include one or N display screens 150, where N is a positive integer greater than 1.

The main control device 100 may implement a photographing function by using the ISP, the camera 190, the video codec, the GPU, the display screen 150, the application processor, and the like.

The ISP is configured to process data fed back by the camera 190. For example, during photographing, a shutter is pressed, light is transferred to a camera photosensitive element through a lens, an optical signal is converted into an electrical signal, and the camera photosensitive element transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 190.

The camera 190 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as RGB or YUV. In embodiments of the present disclosure, the camera 190 includes a camera that acquires an image required for facial recognition, for example, an infrared camera or another camera. The camera for collecting an image required for facial recognition is usually located on a front side of an electronic device, for example, above a touchscreen, or may be located at another position. This is not limited in embodiments of the present disclosure. In some embodiments, the main control device 100 may include another camera. The electronic device may further include a dot matrix transmitter (which is not shown in the figure), to emit light. The camera collects light reflected by a face to obtain a face image. The processor processes and analyzes the face image, and compares the face image with stored face image information for verification.

Optionally, the camera 190 includes some or all of a wide-angle camera, a telephoto camera, a primary camera, and a front-facing camera.

The digital signal processor is configured to process a digital signal, and may process another digital signal in addition to the digital image signal. For example, when the main control device 100 performs frequency selection, the digital signal processor is configured to perform Fourier transform and the like on frequency energy.

The video codec is configured to compress or decompress a digital video. The main control device 100 may support one or more video codecs. In this way, the main control device 100 may play or record videos in a plurality of encoding formats, for example, moving picture experts group (MPEG) 1, MPEG 2, MPEG 3, and MPEG 4.

The NPU is a neural-network (NN) computing processor, quickly processes input information by referring to a structure of a biological neural network, for example, by referring to a mode of transmission between human brain neurons, and may further continuously perform self-learning. The NPU may be used to implement an application such as intelligent cognition of the main control device 100, for example, image recognition, facial recognition, voice recognition, and text understanding.

The external memory interface 120 may be configured to connect to an external storage card such as a Micro SD card, to expand a storage capability of the main control device 100. The external memory card communicates with the processor 110 through the external memory interface 120, to implement a data storage function. For example, files such as music and videos are stored in the external storage card.

The internal memory 121 may be configured to store computer-executable program code, and the executable program code includes instructions. The processor 110 runs the instructions stored in the internal memory 121 to perform various function applications and data processing of the main control device 100. The internal memory 121 may include a program storage area and a data storage area. The program storage area may store an operating system, an application required by at least one function (for example, a facial recognition function, a fingerprint recognition function, and a mobile payment function), and the like. The data storage area may store data (for example, facial information template data and a fingerprint information template) and the like created when the main control device 100 is used. In addition, the internal memory 121 may include a high-speed random access memory, or may include a nonvolatile memory, for example, at least one magnetic disk storage device, a flash memory, or a universal flash storage (UFS).

The main control device 100 may implement an audio function such as music playing or recording by using the audio module 170, the speaker 170A, the telephone receiver 170B, the microphone 170C, the headset jack 170D, the application processor, and the like.

The audio module 170 is configured to convert digital audio information into an analog audio signal for output, and is also configured to convert analog audio input into a digital audio signal.

The speaker 170A, also referred to as a "loudspeaker", is configured to convert an audio electrical signal into a sound signal.

The receiver 170B, also referred to as an "earpiece", is configured to convert an electrical audio signal into a sound signal.

The microphone 170C, also referred to as a "mike" or a "mic", is configured to convert a sound signal into an electrical signal.

The headset jack 170D is configured to connect to a wired headset. The headset jack 170D may be a USB interface 130, or may be a 3.5 mm open mobile terminal platform (OMTP) standard interface or cellular telecommunication industry association of the USA (CTIA) standard interface.

The gyroscope sensor 180A may be configured to determine a motion posture of the main control device 100. In some embodiments, an angular velocity of the main control device 100 around three axes (that is, x, y, and z axes) may be determined through the gyroscope sensor 180A.

The acceleration sensor 180B may be configured to determine an acceleration of the main control device 100.

The touch sensor 180C is also referred to as a "touch panel". The touch sensor 180C may be disposed on the display screen 150. The touch sensor 180C and the display screen 150 form a touchscreen, which is also referred to as a "touchscreen". The touch sensor 180C is configured to detect a touch operation performed on or near the touch sensor. The touch sensor 180C may transfer the detected touch operation to the application processor to determine a type of a touch event. The display screen 150 may provide a visual output related to the touch operation. In some other embodiments, the touch sensor 180K may be alternatively disposed on a surface of the main control device 100, and is located on a position different from that of the display screen 150.

The key 191 includes a power key, a volume key, and the like. The key 191 may be a mechanical key, or a touch key. The main control device 100 may receive a key input, and generate a key signal input related to user setting and function control of the main control device 100.

In the present disclosure, the camera 190 acquires a plurality of first images and a plurality of second images, where the first image is, for example, an image captured by a wide-angle camera or a primary camera, the second image is, for example, an image captured by a telephoto camera, and an object photographed by the first camera is the same as an object photographed by the second camera; and motion information is obtained through the gyroscope sensor 180A and the acceleration sensor 180B in the sensor module 180, then the plurality of first images, the plurality of second images, and the motion information are transmitted to the processor 110; the processor 110 obtains main subject information in each of the plurality of first images, which may determine a main subject in a first image by using a main subject recognition technology or obtain the main subject information in each first image by using a touch instruction detected through the touch sensor 180C or a voice instruction of a user received through the microphone 170C, determines a target camera movement mode based on the main subject information in each of the plurality of first images and the motion information, and fuses the plurality of first images and the plurality of second images based on the target camera movement mode, to obtain a target video; and the target video is displayed on the display screen 150. Optionally, the target video is stored in an external storage card through the external memory interface 120.

A software system of the main control device 100 may use a layered architecture, an event-driven architecture, a microkernel architecture, a micro service architecture, or a cloud architecture. In this embodiment, the software structure of the main control device 100 is illustrated by using an Android system with a layered architecture as an example.

Figure 2B:
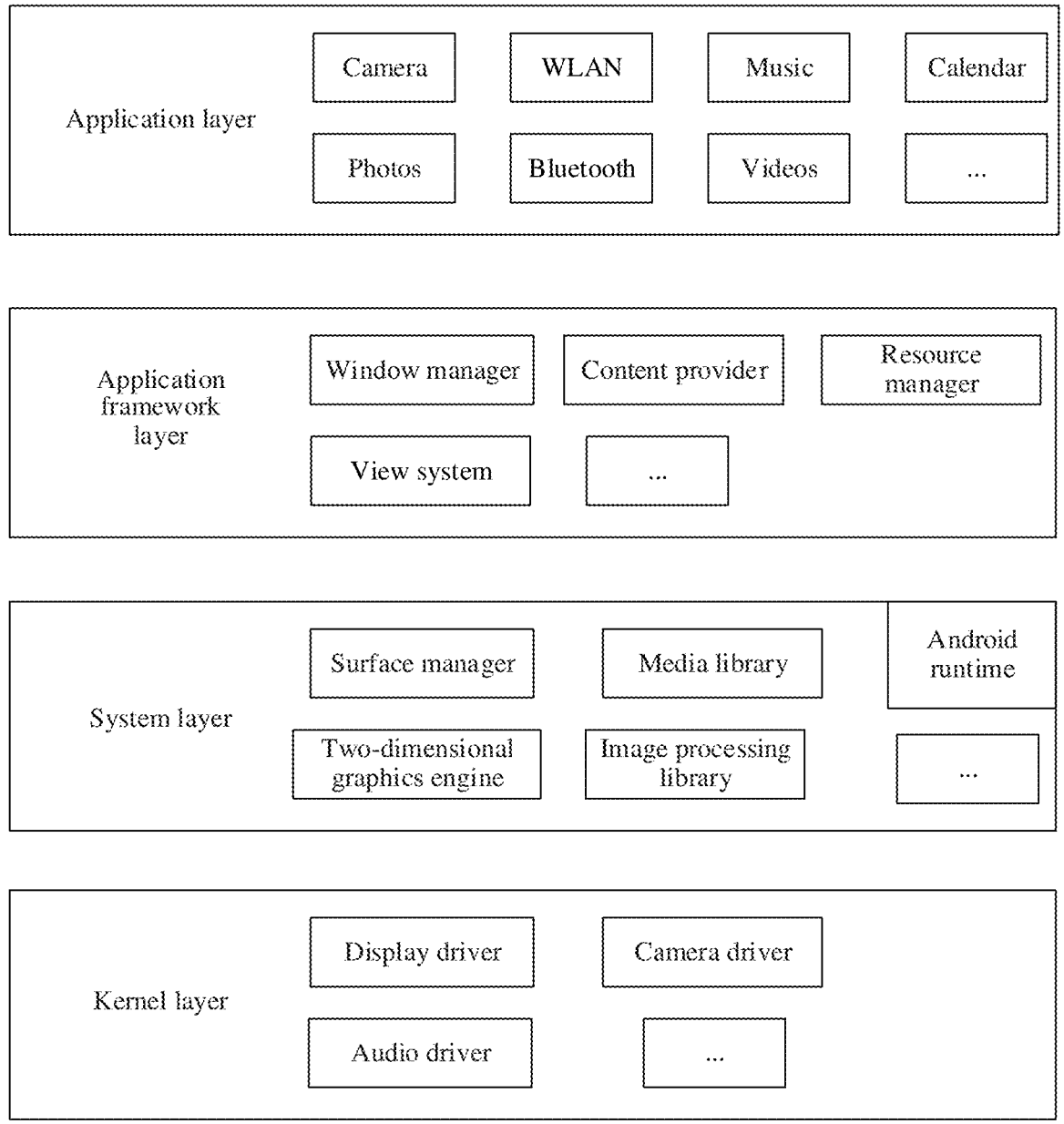
FIG. 2b is a block diagram of a software structure of a main control device according to an embodiment of the present disclosure.

FIG. 2b is a block diagram of a software structure of a main control device 100 according to an embodiment of the present disclosure.

In a layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom. The application layer may include a series of application packages.

As shown in FIG. 2b, the application packages may include application programs (or referred to as applications) such as a camera, photos, WLAN, Bluetooth, music, videos, and a calendar.

The application framework layer provides an application programming interface (API) and a programming framework for an application at the application layer. The application framework layer includes some predefined functions.

As shown in FIG. 2b, the application framework layer may include a window manager, a content provider, a view system, a resource manager, and the like.

The window manager is configured to manage a window program. The window manager may obtain a size of a display screen, determine whether there is a status bar, perform screen locking, take a screenshot, and the like.

The content provider is configured to store and obtain data, and enable the data to be accessed by an application program. The data may include a video, an image, audio, calls that are made and received, a browsing history and a bookmark, a phone book, and the like.

The view system includes visual controls such as a control for displaying a text and a control for displaying an image. The view system may be configured to construct an application program. A display interface may include one or more views. For example, a display interface including an SMS message notification icon may include a text display view and an image display view.

The resource manager provides various resources such as a localized character string, an icon, an image, a layout file, and a video file for an application program.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library (Media Libraries), a two-dimensional graphics engine (for example, SGL), and an image processing library.

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats, for example, MPEG 4, H.264, MP3, AAC, AMR, JPG, and PNG.

The 2D graphics engine is a drawing engine for 2D drawing.

The kernel layer is a layer between hardware and software. The kernel layer includes at least a display driver, a camera driver, an audio driver, and a sensor driver.

In embodiments of the present disclosure, a camera is controlled through the camera driver to obtain a plurality of first images and a plurality of second images. The image processing library obtains main subject information in each of the plurality of first images and motion information of the first camera, determines a target camera movement mode based on the main subject information in each of the plurality of first images and the motion information of the first camera, and fuses the plurality of first images and the plurality of second images based on the target camera movement mode, to obtain a target video; and displays the target video on a display screen through the display driver. For a specific process, refer to the following related description.

The following describes how the main control device 100 implements a multi-camera video recording process.

Figure 3:
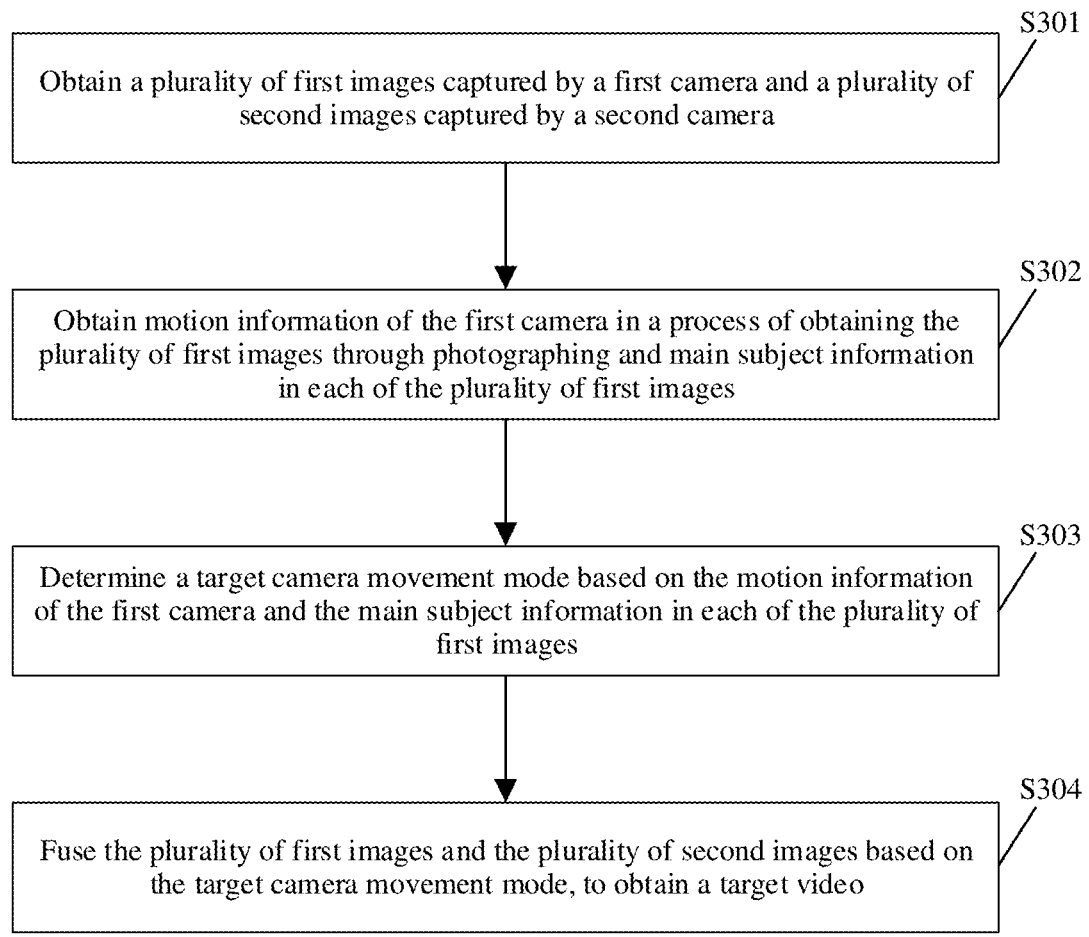
FIG. 3 is a schematic flowchart of a multi-camera video recording method according to an embodiment of the present disclosure.

FIG. 3 is a schematic flowchart of a multi-camera video recording method according to an embodiment of the present disclosure. As shown in FIG. 3, the method includes the following steps.

S301: Obtain a plurality of first images captured by a first camera and a plurality of second images captured by a second camera.

The plurality of first images and the plurality of second images are respectively obtained through photographing a same photographed object by using the first camera and the second camera, and a parameter of the first camera is different from a parameter of the second camera.

Specifically, that the parameter of the first camera is different from the parameter of the second camera includes:
a field of view (FOV) of the first camera is greater than an FOV of the second camera, or a focal length of the first camera is less than a focal length of the second camera.

Optionally, a frame rate when the first camera acquires the first images is the same as a frame rate when the second camera acquires the second images. In other words, in a same period of time, a quantity of frames of the first images captured by the first camera is the same as a quantity of frames of the second images captured by the second camera, and a first image and a second image acquired at a same moment have a same timestamp.

It should be noted herein that, in the present disclosure, a timestamp of an image is a time at which a camera obtains the image through photographing.

Optionally, the first camera and the second camera may be of a same device, or may be of different devices.

In a feasible embodiment, the first camera is a wide-angle camera, a primary camera, or a front-facing camera, and the second camera is a telephoto camera or a primary camera.

In a feasible embodiment, the first images and the second images may be obtained from a same device, or may be obtained from different devices. For example, a main control device includes the first camera and the second camera, and both the first images and the second images may be captured by the main control device. For another example, the main control device includes the first camera, and a secondary device includes the second camera. The main control device acquires the first images through the first camera, and after the secondary device acquires the plurality of second images, the main control device obtains the plurality of second images captured by the secondary device. For another example, the secondary device includes the first camera and the second camera, and the main control device does not include the first camera and/or the second camera. After the secondary device obtains the plurality of first images and the plurality of second images respectively through the first camera and the second camera, the main control device obtains the plurality of first images and the plurality of second images that are captured by the secondary device.

In this manner, the main control device can also obtain the first images captured by the first camera and/or the second images captured by the second camera from another device without including the first camera and/or the second camera, so as to implement recording based on a multi-camera video.

S302: Obtain motion information of the first camera in a process of obtaining the plurality of first images through photographing and main subject information in each of the plurality of first images.

Optionally, a main subject may be a person, an animal, or an object, for example, a mobile phone, a cup, a school bag, or a car.

In a feasible embodiment, the obtaining motion information of the first camera in a process of obtaining the plurality of first images through photographing includes:
performing feature extraction on each of the plurality of first images, to obtain a feature point in each of the plurality of first images; matching feature points in two adjacent images of the plurality of first images, to obtain a matching result; and then determining the motion information of the first camera based on the feature matching result; or
directly obtaining the motion information of the first camera from a sensor.

In an example, whether the first camera is displaced in the process of obtaining the plurality of first images through photographing is determined based on the motion information of the first camera in the process of obtaining the plurality of first images through photographing, to determine whether the first camera is moving or stationary. Further, in a case that the first camera is moving when obtaining the plurality of first images through photographing, the motion information further indicates that the first camera moves in a same direction or performs a reciprocating motion in two opposite directions when obtaining the plurality of first images through photographing.

In an optional embodiment, the obtaining main subject information in each of the plurality of first images includes:
performing image salience detection on each of the plurality of first images, to obtain a salient region in each first image; obtaining a maximum rectangular region that includes the salient region in each first image; and performing deep learning based on a convolutional neural network on the maximum rectangular region in each first image by using, for example, a scene recognition technology, a human body recognition technology, or a facial recognition technology, to obtain the main subject information in each first image. The maximum rectangular region is an ROI.

When there is a plurality of main subjects in a first image, a plurality of salient regions may be obtained by performing salience detection on the first image, and an ROI is a maximum rectangular region including the plurality of salient regions.

It should be noted herein that a shape including the salient regions is not limited to a rectangle, or may be another regular shape such as a square, a triangle, a circle, or an ellipse, or certainly may be an irregular shape.

In an optional embodiment, the main subject information in each of the plurality of first images is determined based on a user instruction.

Optionally, the user instruction may be a voice instruction, a touch instruction, or an instruction in another form of a user.

For example, the voice instruction may be "determining a person as a main subject" or "a main subject is an animal". When receiving the voice instruction, the main control device determines a person or an animal in the first image as the main subject in the first image.

For another example, after the first image is displayed on a display interface of the main control device, the main control device detects a touch instruction of a user. When detecting the touch instruction of the user, the main control device determines an object in a region in which the touch instruction is detected as the main subject in the first image.

S303: Determine a target camera movement mode based on the motion information of the first camera and the main subject information in each of the plurality of first images.

In a feasible embodiment, the determining a target camera movement mode based on the motion information of the first camera and the main subject information in each of the plurality of first images includes:

determining, based on the motion information of the first camera, whether the first camera is displaced in the process of obtaining the plurality of first images through photographing;

determining, when it is determined that the first camera is not displaced, the target camera movement mode based on the main subject information in each of the plurality of first images; and determining, when it is determined that the first camera is displaced, the target camera movement mode based on a motion manner of the first camera and the main subject information in each of the plurality of first images.

Whether the first camera is moving or stationary in a video recording process is determined based on the motion information of the first camera, and then an appropriate camera movement mode is selected in two different manners for two cases that the first camera is moving or stationary.

In a feasible embodiment, the determining, when it is determined that the first camera is stationary, the target camera movement mode based on the main subject information in each of the plurality of first images includes:

determining the target camera movement mode as a push-in lens when the main subject information in each of the plurality of first images indicates that each of the plurality of first images includes a main subject, and a first ratio of each of the plurality of first images is less than a first preset ratio. Optionally, the first ratio of the first image is a ratio of an area of an ROI in which the main subject in the first image is located to an area of the first image; or the first ratio of the first image is a ratio of a width of an ROI in which the main subject in the first image is located to a width of the first image; or the first ratio of the first image is a ratio of a height of an ROI in which the main subject in the first image is located to a height of the first image. Preferably, the first ratio of the first image is the ratio of the height of the ROI in which the main subject in the first image is located to the height of the first image; and determining the target camera movement mode as a pull-out lens when the main subject information in each of the plurality of first images indicates that a default ROI region in each first image does not include the main subject, and an image in the default ROI in each first image is a part of the first image.

It should be noted herein that, when subject detection is performed on a first image, a default ROI is first given, so that the main control device mainly performs subject detection on an image in the ROI.

Figure 4:
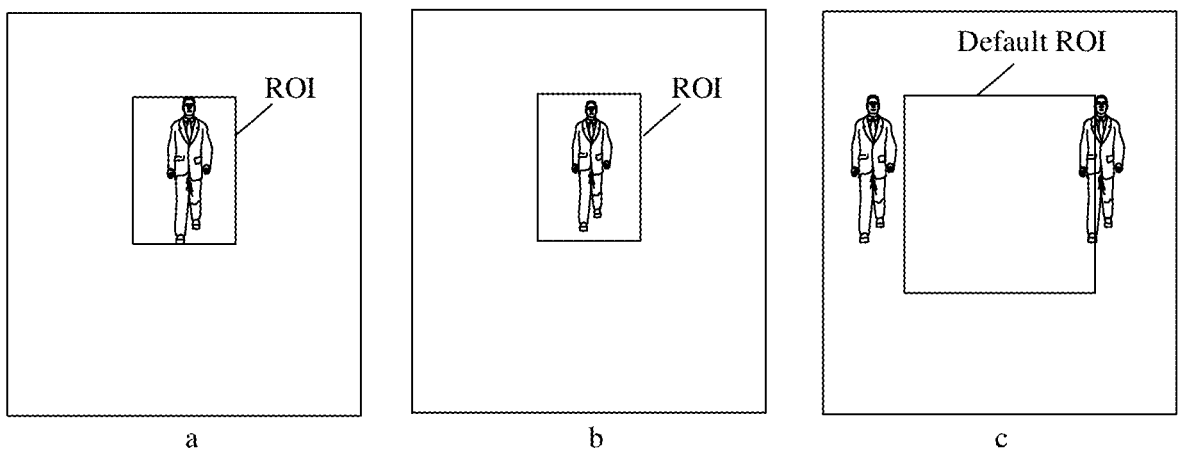
FIG. 4 shows an ROI and a default ROI in a first image.

Specifically, for first images shown in a figure a and a figure b in FIG. 4, a small rectangular box is an ROI, and an area of the ROI is smaller than an area of the first image. In addition, for a user, a main subject in the first image is unclear. Therefore, the target camera movement mode is determined as a push-in lens, so that the user can see the main subject clearly. As shown in a figure c in FIG. 4, a default ROI does not include a main subject or does not include a complete main subject. In this case, to enable the main subject to be completely presented in the ROI, the target camera movement mode is determined as a pull-out lens.

In a feasible embodiment, the determining, when it is determined that the first camera is moving, the target camera movement mode based on a motion manner of the first camera and the main subject information in each of the plurality of first images includes:

determining the target camera movement mode as a traveling lens when the motion manner of the first camera indicates that the first camera moves in a same direction when obtaining the plurality of first images through photographing, and the main subject information in each of the plurality of first images indicates that main subjects in the plurality of first images change;

determining the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and determining the target camera movement mode as a follow lens when the motion manner of the first camera indicates that the first camera moves when obtaining the plurality of first images through photographing, and the main subject information in each of the plurality of first images indicates that the main subjects in the plurality of first images do not change.

Figure 5:
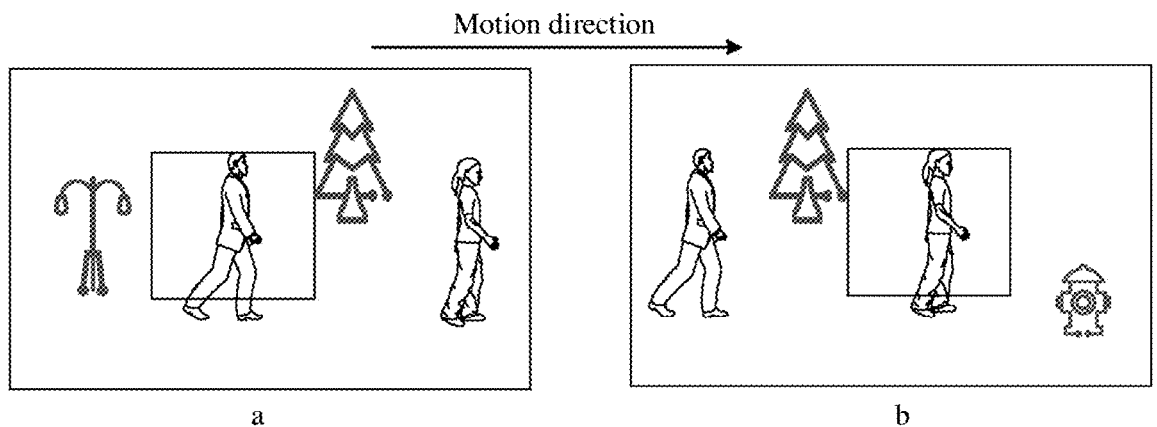
FIG. 5 shows a variation of a main subject in an ROI in a first image and a lens movement direction in a case of a traveling lens.

As shown in a figure a and a figure b in FIG. 5, the first camera moves in one direction, and main subjects in ROIs in first images change. As shown in the figure a in FIG. 5, a main subject is a male; and as shown in the figure b in FIG. 5, a main subject is a female, and the main subjects change. Therefore, the target camera movement mode is determined as a traveling lens.

Figure 6:
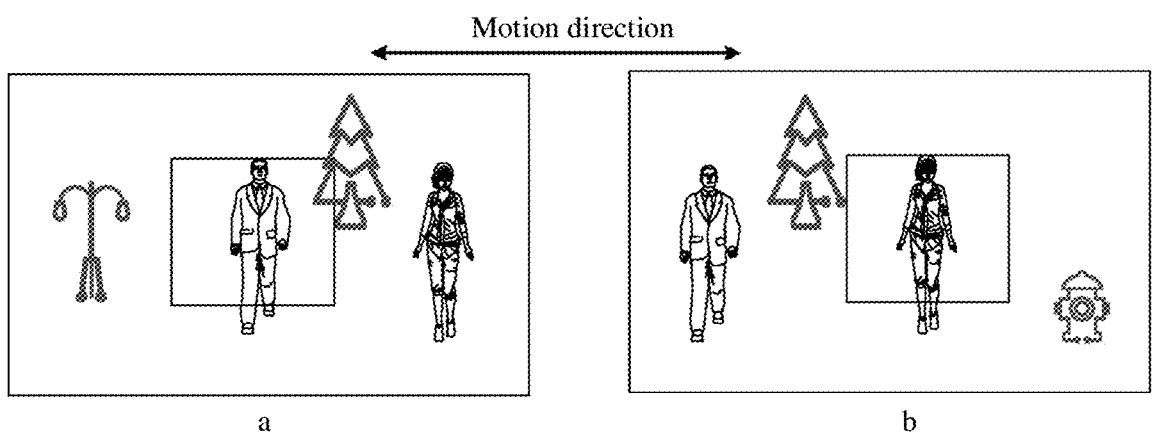
FIG. 6 shows a variation of a main subject in an ROI in a first image and a lens movement direction in a case of a panning lens.

As shown in a figure a and a figure b in FIG. 6, the first camera performs a reciprocating motion in left and right directions, and main subjects in ROIs in first images change. For example, at a first moment, a main subject in an ROI in a first image is a male. When the first camera moves to the right at a second moment, a main subject in an ROI in a first image is a female. When the first camera moves to the left at the second moment, the main subject in the ROI in the first image is the male. In such reciprocation, thus the target camera movement mode is determined as a panning lens.

Figure 7:
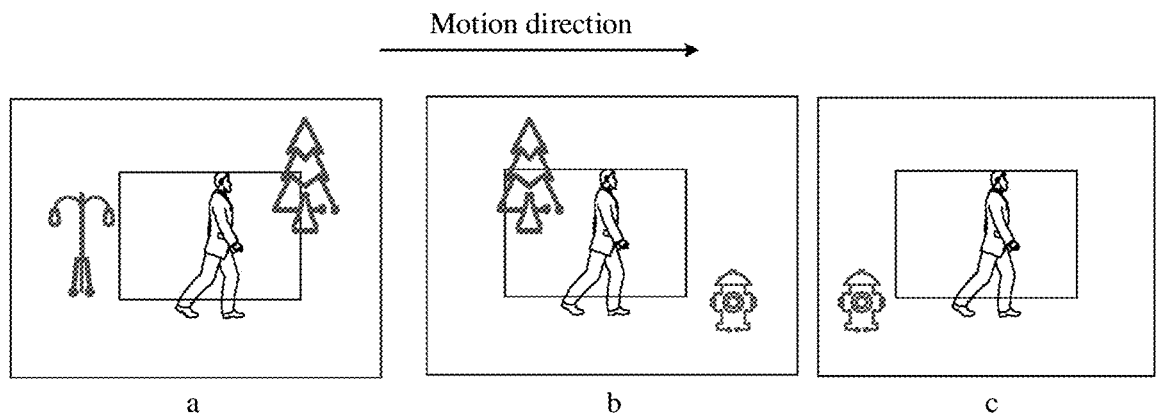
FIG. 7 shows a variation of a main subject in an ROI in a first image and a lens movement direction in a case of a follow lens.

As shown in a figure a, a figure b, and a figure c in FIG. 7, the first camera moves along with a main subject in one direction, and the main subject in ROIs in first images does not change. Therefore, the target camera movement mode is determined as a follow lens.

In a feasible embodiment, the target camera movement mode may alternatively be determined in the following manner:

determining a shotsize of each first image based on the main subject information in each of the plurality of first images, and then determining the target camera movement mode based on the shotsize of each of the plurality of first images and the main subject information.

Specifically, the determining a shotsize of each first image based on the main subject information in each of the plurality of first images includes:

determining the shotsize of the first image as a full shot when a quantity of main subjects in each of the plurality of first images is greater than or equal to a first preset quantity and scene understanding information indicates an ambient environment to be presented or when a motion amplitude of a main subject in each of the plurality of first images is greater than a preset amplitude and scene understanding information indicates an ambient environment to be presented;

determining the shotsize of each first image as a medium shot when the quantity of main subjects in each first image is less than the first preset quantity and the scene understanding information indicates that there are dialog, action, and emotional communication in a current scene;

determining the shotsize of each first image as a close shot when the quantity of main subjects in each first image is a second preset quantity, the motion amplitude of the main subject in the first image is less than or equal to the preset amplitude, and the scene understanding information indicates that a subtle action of an upper body needs to be highlighted, where the second preset quantity is less than the first preset quantity; and determining the shotsize of each first image as a close-up when the quantity of main subjects in each first image is the second preset quantity, the motion amplitude of the main subject in the first image is less than or equal to the preset amplitude, and the scene understanding information indicates that local information needs to be highlighted.

For example, refer to the following Table 1, Table 1 is a table of a correspondence between the main subject information and the scene understanding information and a shotsize type.

TABLE 1

| Main subject information and scene understanding information | Shotsize type |
|---|---|
| One main subject, no large motion, and local information such as a facial expression needs to be highlighted | Close-up |
| One main subject, no large motion, and a subtle action of an upper body needs to be highlighted | Close shot |
| Within three main subjects, and there are dialog, action, and emotional communication in a scene | Medium shot |
| More than three main subjects, or large motions, and an ambient environment needs to be presented | Full shot |

As shown in Table 1, when the quantity of main subjects in the first image is 1, the main subject has no large-amplitude motion, and the scene understanding information indicates that the local information such as a facial expression needs to be highlighted, the shotsize of the first image is the close-up; when the quantity of main subjects in the first image is 1, the main subject has no large-amplitude motion, and the scene understanding information indicates that the subtle action of the upper body needs to be highlighted, the shotsize of the first image is the close shot; when the quantity of main subjects in the first image is within three, and the scene understanding information indicates that the current scene is a scene having dialog, action, and emotional communication, the shotsize of the first image is the medium shot; and when the quantity of main subjects in the first image is greater than 3, and the scene understanding information indicates the ambient environment to be presented, or when the main subjects in the first image have large-amplitude motions, and the scene understanding information indicates the ambient environment to be presented, the shotsize of the first image is the full shot.

Figure 8:
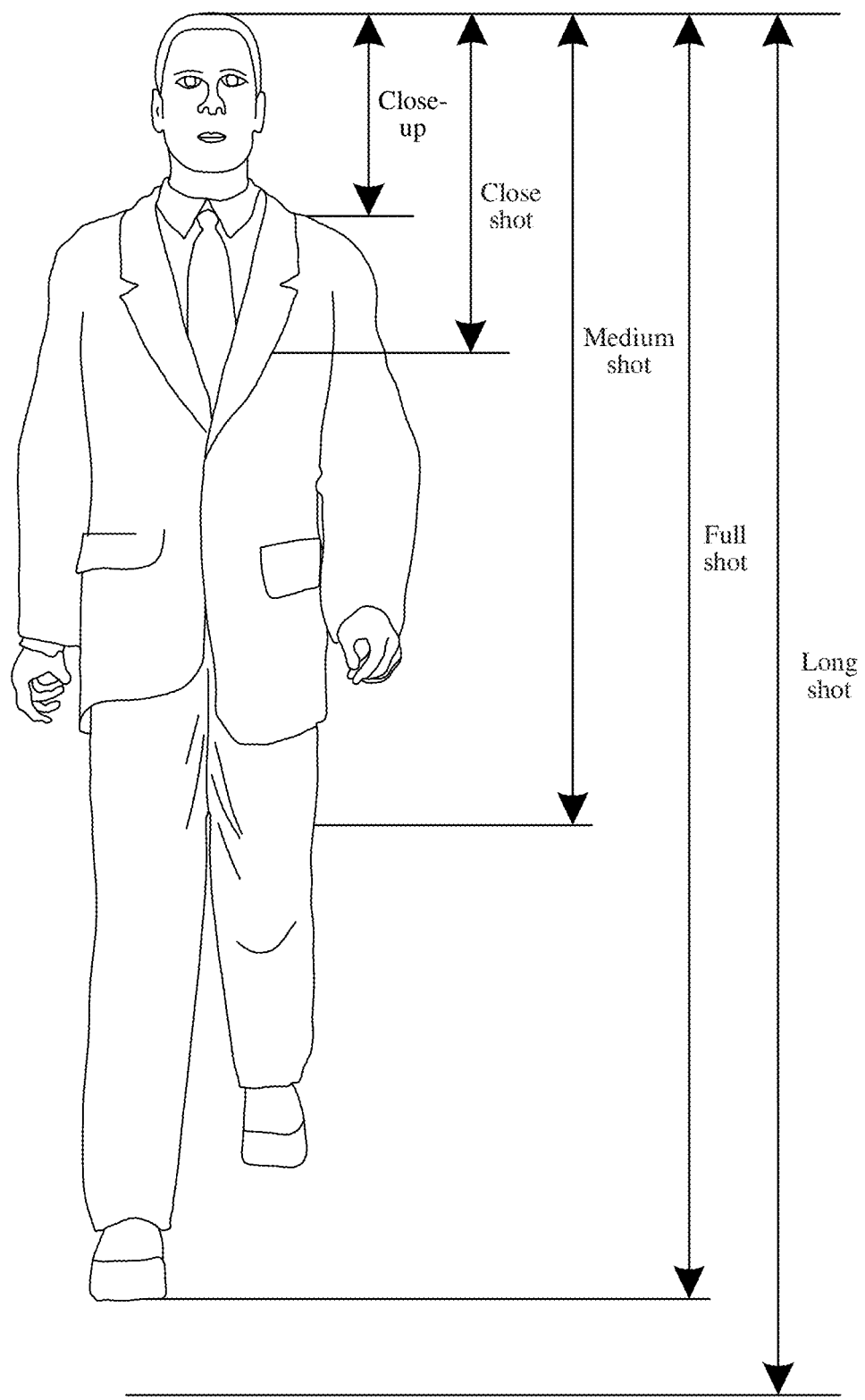
FIG. 8 is a schematic diagram of different shotsizes.

It should be noted herein that, the shotsize means a difference between ranges of a photographed object presented in a camera video recorder due to different distances between the camera and the photographed object. The shotsize may be generally classified as five types, which are respectively a close-up (above a shoulder of a human body), a close shot (above a chest of the human body), a medium shot (above a knee of the human body), a full shot (all and a part of an ambient environment of the human body), and a long shot (an environment in which a photographed object is located) from near to far as shown in FIG. 8.

Optionally, in a feasible embodiment, the determining a shotsize of each first image based on the main subject information in each of the plurality of first images includes:

determining a second ratio of each first image based on the main subject in each of the plurality of first images, where the second ratio is a ratio of a part of the main subject in the first image located in the ROI to the main subject in the first image; and determining the shotsize of each first image as a close-up when the second ratio of each first image is less than a second preset ratio; determining the shotsize of each first image as a close shot when the second ratio of each first image is greater than or equal to the second preset ratio and less than a third preset ratio; determining the shotsize of each first image as a medium shot when the second ratio of each first image is greater than or equal to the third preset ratio and less than a fourth preset ratio; obtaining a third ratio of the first image when the second ratio of each first image is equal to the fourth preset ratio, where the third ratio is a ratio of a region in which the main subject is occupied in the first image to the ROI; determining the shotsize of the first image as a full shot if the third ratio of the first image is greater than or equal to a fifth preset ratio; and determining the shotsize of the first image as a long shot if the third ratio is less than the fifth preset ratio.

Figure 9:
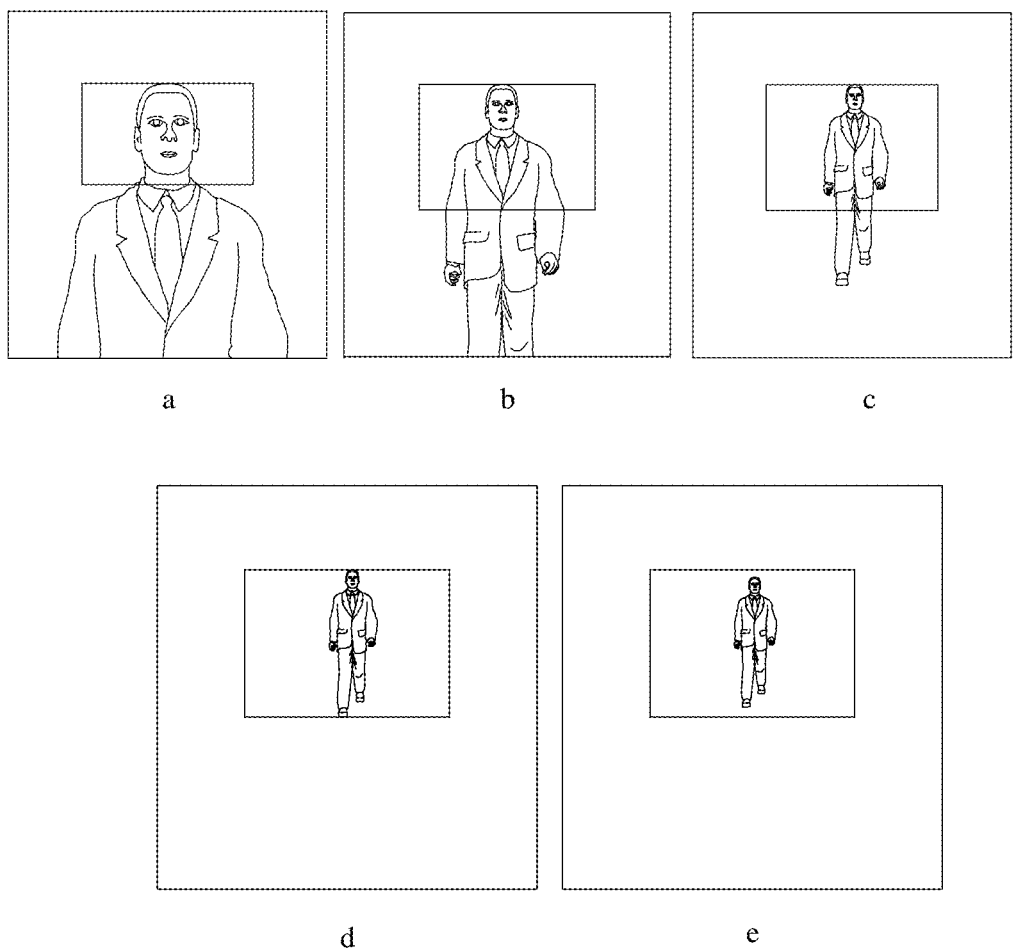
FIG. 9 shows a main subject in an ROI of a first image in different shotsizes.

For example, as shown in FIG. 9, it is assumed that the second ratio is a ratio of a part above a human shoulder to the entire person, the third ratio is a ratio of a part above a human waist to the entire person, and a fourth ratio is 100%. As shown in a figure a in FIG. 9, a part of a main subject in a first image located in an ROI is a head, and a ratio of the head to the entire person is less than the second ratio. Therefore, a shotsize in the figure a in FIG. 9 is a close-up. As shown in a figure b in FIG. 9, the part of the main subject in the first image located in the ROI is a part above a chest, and a ratio of the part above the chest to the entire person is greater than the second ratio but less than the third ratio. Therefore, the shotsize in the figure b in FIG. 9 is a close shot. As shown in a figure c in FIG. 9, the part of the main subject in the first image located in the ROI is a part above thighs, and a ratio of the part above the thighs to the entire person is greater than the second ratio but less than the fourth ratio. Therefore, the shotsize in the figure a in FIG. 9 is a medium shot. As shown in a figure d and a figure e in FIG. 9, the main subject in the figure d and the figure e is completely located in the ROI, but a ratio of the main subject to the ROI in the figure e is different from a ratio of the main subject to the ROI in the figure d. The shotsize in the figure d in FIG. 9 may be determined as a full shot, and the shotsize in the figure e in FIG. 9 may be determined as a long shot.

It should be noted herein that the manner of determining a shotsize of an image in the present disclosure constitutes no limitation on the present disclosure, and certainly there may further be another manner.

Optionally, in a feasible embodiment, the determining the target camera movement mode based on the shotsize of each of the plurality of first images and the main subject information includes:

determining the target camera movement mode as follow when all the shotsizes of the plurality of first images are the same and all the main subjects in the plurality of first images are the same; determining the target camera movement mode as push-in or pull-out when the shotsizes of the plurality of first images are different and all the main subjects in the plurality of first images are the same; and determining the target camera movement mode as traveling or panning when all the shotsizes of the plurality of first images are the same, and the main subjects in the plurality of first images are different, as shown in the following Table 2.

TABLE 2

| Main subject and shotsize information | Camera movement mode |
| --- | --- |
| Same main subject, different shotsizes | Push-in/pull-out |
| Same main subject, same shotsize | Follow |
| Different main subjects, same shotsize | Traveling/panning |

It should be noted herein that the camera movement mode includes, but not limited to, the foregoing push-in/pull-out, follow, and traveling/panning, and may further include whip pan or tilt, and even include some special effect fusions such as a slow motion, dolly zoom, and a cinema graph. In addition, a correspondence between the main subject and the shotsize information and the camera movement mode shown in Table 2 is merely an example, and is not intended to limit the present disclosure.

It should be noted herein that that the shotsizes of the plurality of first images are different may be that the shotsizes of the plurality of first image are different from each other or the shotsizes of some of the plurality of first images are different. Similarly, that the main subjects in the plurality of first images are different may be that the main subjects in the plurality of first image are different from each other or the main subjects in some of the plurality of first images are different.

S304: Fuse the plurality of first images and the plurality of second images based on the target camera movement mode, to obtain a target video.

A camera movement effect of the target video is the same as a camera movement effect of a video obtained in the target camera movement mode.

In a feasible embodiment, when the target camera movement mode is the push-in lens or the pull-out lens, the fusing the plurality of first images and the plurality of second images based on the target camera movement mode, to obtain a target video includes:

obtaining a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtaining a plurality of first image pairs from the plurality of first images and the plurality of second images, where each second image pair of the plurality of first image pairs includes a first image and a second image that have a same timestamp; obtaining a plurality of first target images from each second image pair of the plurality of second image pairs, where the plurality of first target images are in a one-to-one correspondence with the plurality of first image pairs, and each of the plurality of first target images is an image that has a smallest viewing angle range in a corresponding first image pair and that includes a preset region in the first image; cutting each of the plurality of first target images to obtain a part that overlaps an image in a preset region in a first image in a second image pair to which the first target image belongs, to obtain a plurality of third images; and processing each of the plurality of third images to obtain a plurality of processed third images, where a resolution of each of the plurality of processed third images is a preset resolution, and the target video includes the plurality of processed third images.

It should be noted herein that the size of the preset region in the first image may be a pixel area of the preset region in the first image, or a ratio of the preset region to the first image, or a height and a width of the preset region.

Specifically, a preset region is set for each of the plurality of first images, and the preset region in each first image includes a main subject. In addition, to reflect a visual effect of the push-in lens or the pull-out lens, when the target camera movement mode is the push-in lens, sizes of the preset regions in the plurality of first images are gradually reduced in a collection time sequence, that is, for any two adjacent first images in the plurality of first images in terms of collection time, an image in a preset region in a first image with an earlier timestamp includes an image in a preset region in a first image with a later timestamp; and when the target camera movement mode is the pull-out lens, the sizes of the preset regions in the plurality of first images gradually increase in the collection time sequence, that is, for any two adjacent first images in the plurality of first images in terms of collection time, an image in a preset region in a first image with a later timestamp includes an image in a preset region in a first image with an earlier timestamp. Then, a plurality of first target images are obtained from the plurality of first images and second images corresponding to the plurality of first images based on the preset regions in the first images, where the first target image is an image in the preset region in the first image, but whether the image in the preset region is specifically a part of the first image or a part of the second image is determined based on the following method.

When an image in a preset region in a first image is included in a second image corresponding to the first image, the second image is cut to obtain a part that overlaps the image in the preset region in the first image as a corresponding first target image; when the image in the preset region in the first image includes the second image corresponding to the first image, the first image is cut to obtain the image in the preset region as a corresponding first target image, that is, an image that has a smallest viewing angle range and includes the image in the preset region in the first image is determined from the first image and the corresponding second image, and then the image that has the smallest viewing angle range is cut to obtain a part that overlaps the image in the preset region, so as to obtain the first target image, where the second image corresponding to the first image is an image whose timestamp is the same as a timestamp of the first image.

After a plurality of first target images are obtained based on the method, each of the plurality of first target images is cut to obtain a part that overlaps an image in a preset region in a first image corresponding to the first target image, so as to obtain a plurality of third images. To display the third images based on a preset resolution, each of the plurality of third images is processed, to obtain a plurality of processed third images, where a resolution of each of the plurality of processed third images is a preset resolution, and the target video includes the plurality of processed third images.

It should be noted herein that that the preset region in each of the plurality of first images includes the main subject specifically means that the preset regions in the plurality of first images include some or all of the main subjects. Further, when the target camera movement mode is the push-in lens, the preset regions in the plurality of first images include a transition from a first subset of the main subjects to a second subset of the main subjects in a time sequence, where the first subset of the main subjects includes the second subset of the main subjects, the first subset of the main subjects is all or some of the main subjects, and the second subset of the main subjects is some of the main subjects. When the target camera movement mode is the pull-out lens, the preset regions in the plurality of first images include a transition from a third subset of the main subjects to a fourth subset of the main subjects in the time sequence, where the fourth subset of the main subjects includes the third subset of the main subjects, the fourth subset of the main subjects is all or some of the main subjects, and the third subset of the main subjects is some of the main subjects.

The third images are displayed based on the foregoing timestamp, so as to implement a target video with a camera movement effect of "push" or "pull".

In a feasible embodiment, when the target camera movement mode is the traveling lens, the follow lens, or the panning lens, the fusing the plurality of first images and the plurality of second images based on the target camera movement mode, to obtain a target video includes:

performing subject detection and extraction on the plurality of first images to obtain an ROI in each of the plurality of first images, and cutting the ROI in each of the plurality of first images to obtain a plurality of fourth images, where each of the plurality of fourth images includes a main subject; and the plurality of first images are in a one-to-one correspondence with the plurality of fourth images, and a timestamp of each of the plurality of fourth images is the same as a timestamp of a first image corresponding to the fourth image; processing each of the plurality of fourth images to obtain a plurality of fifth images, where a resolution of each of the plurality of fifth images is a preset resolution; and the plurality of fourth images are in a one-to-one correspondence with the plurality of fifth images, and a timestamp of each of the plurality of fifth images is the same as a timestamp of a fourth image corresponding to the fifth image; obtaining a plurality of second image pairs from the plurality of second images and the plurality of fifth images, where each of the plurality of second image pairs includes a fifth image and a second image that have a same timestamp; and obtaining a plurality of second target images from the plurality of second image pairs, where the plurality of second target images are in a one-to-one correspondence with the plurality of image pairs; for each of the plurality of second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the second target image corresponding to the image pair is the fifth image; and the target video includes the plurality of second target images.

It should be noted herein that that each of the plurality of fourth images includes the main subject may be understood that each of the plurality of fourth images may include some or all of the main subjects.

It should be noted herein that the foregoing step "performing subject detection and extraction on the plurality of first images, to obtain an ROI in each of the plurality of first images" may not be performed, and the ROI obtained in step S302 may be directly used.

Figure 10:
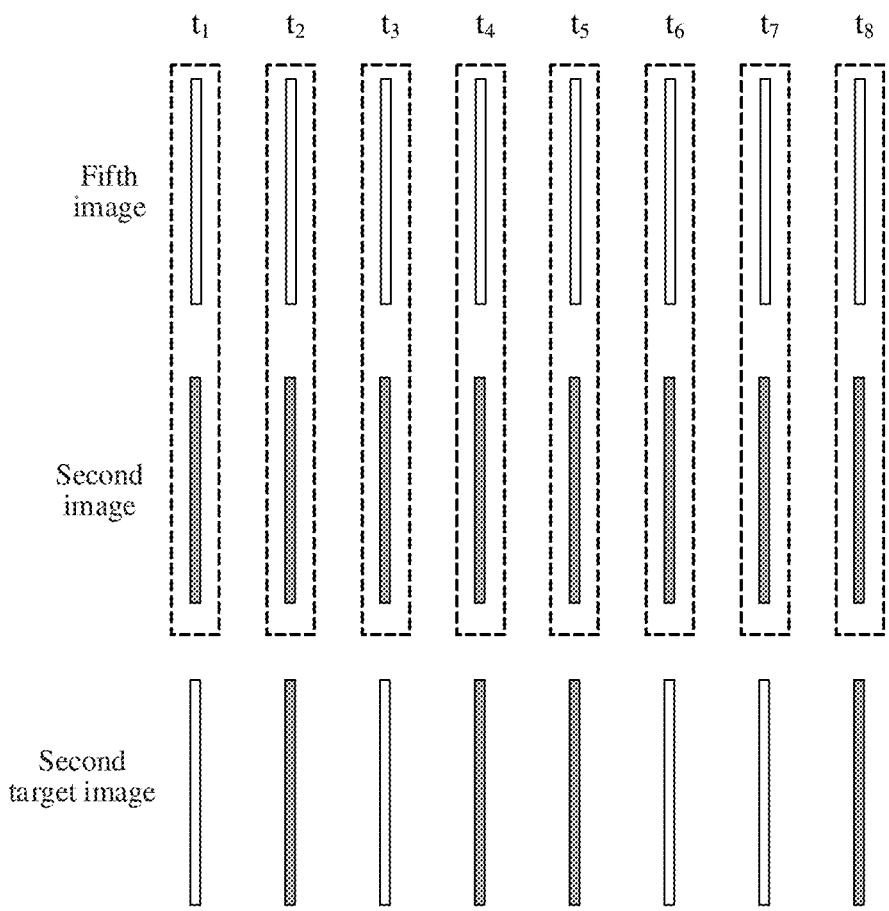
FIG. 10 shows images included in a second image pair.

For example, it is assumed that the first camera acquires eight first images, and timestamps of the eight first images are respectively $t_1$, $t_2$, $t_3$, $t_4$, $t_5$, $t_6$, $t_7$, and $t_8$; and the second camera acquires eight second images, and timestamps of the eight second images are respectively $t_1$, $t_2$, $t_3$, $t_4$, $t_5$, to, $t_7$, and $t_8$. Subject detection and extraction are performed on ROIs in the eight first images, to obtain eight fourth images. Each of the eight fourth images includes a main subject, and a timestamp of each of the eight fourth images is the same as a timestamp of a first image to which the fourth image belongs. Therefore, the timestamps of the eight fourth images are respectively $t_1$, $t_2$, $t_3$, $t_4$, $t_5$, $t_6$, $t_7$, and $t_8$. Then, super resolution is performed on each of the eight fourth images, to obtain eight fifth images, where a resolution of each of the eight fifth images is a preset resolution, and timestamps of the eight fifth images are respectively $t_1$, $t_2$, $t_3$, $t_4$, $t_5$, $t_6$, $t_7$, and $t_8$. As shown in FIG. 10, in the eight second images and the eight fifth images, a second image and a fifth image that have a same timestamp are classified into an image pair, to obtain eight second image pairs, where the image pairs are shown in dashed-line boxes in FIG. 10. Eight second target images are obtained from the eight second image pairs. For each of the eight second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the third target image corresponding to the second image is the fifth image, and the eight second target images form the target video. As shown in FIG. 10, content of second images and content of fifth images in second image pairs corresponding to timestamps $t_2$, $t_4$, $t_5$, and $t_8$ in the eight image pairs overlap, and content of second images and content of fifth images in second image pairs corresponding to timestamps $t_1$, $t_3$, $t_6$, and $t_7$ do not overlap. Therefore, the target video includes the fifth images with the timestamps of $t_1$, $t_3$, $t_6$, and $t_7$ and the second images with the timestamps of $t_1$, $t_3$, $t_6$, and $t_7$.

Figure 11A:
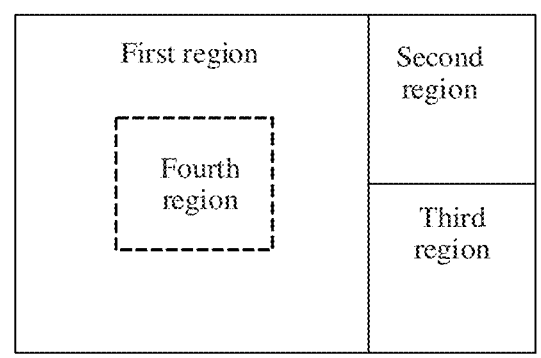
FIG. 11a is a schematic diagram of a display interface according to an embodiment of the present disclosure.

Optionally, in a feasible embodiment, an image captured by the first camera, an image captured by the second camera, and the target video are displayed on a display interface. As shown in FIG. 11a, a display interface includes three regions: a first region, a second region, and a third region, the first region is used to display the image captured by the first camera, the second region is used to display the image captured by the second camera, and the third region is used to display the target video.

Further, as shown in FIG. 11a, the first region includes a fourth region, and the fourth region is used to display an overlapping part between the image captured by the first camera and the image captured by the second camera.

The first camera is a wide-angle camera or a primary camera, the second camera is a telephoto camera or a primary camera, and an FOV of the first camera is greater than an FOV of the second camera.

In a feasible embodiment, the fusing the plurality of first images and the plurality of second images based on the target camera movement mode, to obtain a target video includes:
fusing the plurality of first images, the plurality of second images, and a plurality of sixth images based on the target camera movement mode, to obtain the target video, where
the sixth image is obtained through photographing the photographed object by using a third camera, a parameter of the third camera is different from the parameter of the first camera, and the parameter of the third camera is different from the parameter of the second camera.

Optionally, the FOV of the first camera is greater than the FOV of the second camera, and an FOV of the third camera is greater than the FOV of the second camera and less than the FOV of the first camera; or the focal length of the first camera is less than the focal length of the second camera, and a focal length of the third camera is less than the focal length of the second camera.

For example, the first camera is a wide-angle camera, the second camera is a telephoto camera, and the third camera is a primary camera.

Optionally, in a feasible embodiment, when the target camera movement mode is the push-in lens or the pull-out lens, the fusing the plurality of first images, the plurality of second images, and a plurality of sixth images based on the target camera movement mode, to obtain the target video includes:
obtaining a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtaining a plurality of third image pairs from the plurality of first images, the plurality of second images, and the plurality of sixth images, where each of the plurality of third image pairs includes a first image, a second image, and a sixth image that have a same timestamp; obtaining a plurality of third target images from the plurality of third image pairs, where the plurality of third target images are in a one-to-one correspondence with the plurality of third image pairs, and each of the plurality of third target images is an image that has a smallest viewing angle range in a corresponding third image pair and that includes a preset region in the first image; cutting each of the plurality of third target images to obtain a part that overlaps an image in a preset region in a first image in a third image pair to which the third target image belongs, to obtain a plurality of seventh images; and processing each of the plurality of seventh images to obtain a plurality of eighth images, where a resolution of each of the plurality of eighth images is a preset resolution, and the target video includes the plurality of eighth images.

Specifically, a preset region is set for each of the plurality of first images, and the preset region in each first image includes a main subject. In addition, to reflect a visual effect of the push-in lens or the pull-out lens, when the target camera movement mode is the push-in lens, sizes of the preset regions in the plurality of first images are gradually reduced in a collection time sequence, that is, for any two adjacent first images in the plurality of first images in terms of collection time, an image in a preset region in a first image with an earlier timestamp includes an image in a preset region in a first image with a later timestamp; and when the target camera movement mode is the pull-out lens, the sizes of the preset regions in the plurality of first images gradually increase in the collection time sequence, that is, for any two adjacent first images in the plurality of first images in terms of collection time, an image in a preset region in a first image with a later timestamp includes an image in a preset region in a first image with an earlier timestamp. Then, a plurality of third target images are obtained from the plurality of first images and second images and sixth images corresponding to the plurality of first images based on the preset regions in the first images, where the third target image is an image in the preset region in the first image, but whether the image in the preset region is specifically a part of the first image or a part of the second image or a part of the sixth image is determined based on the following method.

When an image in a preset region in a first image is included in a sixth image corresponding to the first image, the sixth image is cut to obtain a part that overlaps the image in the preset region in the first image as a corresponding third target image; when the image in the preset region in the first image includes the sixth image corresponding to the first image, and when the image in the preset region in the first image is included in a second image corresponding to the first image, the second image is cut to obtain a part that overlaps the image in the preset region in the first image as a corresponding third target image; when the image in the preset region in the first image includes the second image and the sixth image that correspond to the first image, the first image is cut to obtain the image in the preset region as a corresponding first target image, that is, an image that has a smallest viewing angle range and includes the image in the preset region in the first image is determined from the first image and the corresponding second image and sixth image, and then the image that has the smallest viewing angle range is cut to obtain a part that overlaps the image in the preset region, so as to obtain the third target image, where the second image and the sixth image that correspond to the first image are respectively a second image and a sixth image whose timestamps are the same as the timestamp of the first image.

After a plurality of third target images are obtained based on the method, each of the plurality of third target images is cut to obtain a part that overlaps an image in a preset region in a first image in a third image pair to which the third target image belongs, so as to obtain a plurality of seventh images. To display the seventh images based on a preset resolution, each of the plurality of seventh images is processed, to obtain a plurality of eighth images, where a resolution of each of the plurality of eighth images is a preset resolution, and the target video includes the plurality of eighth images.

It should be noted herein that that the preset region in each of the plurality of first images includes the main subject specifically means that the preset regions in the plurality of first images include some or all of the main subjects. Further, when the target camera movement mode is the push-in lens, the preset regions in the plurality of first images include a transition from a first subset of the main subjects to a second subset of the main subjects in a time sequence, where the first subset of the main subjects includes the second subset of the main subjects, the first subset of the main subjects is all or some of the main subjects, and the second subset of the main subjects is some of the main subjects. When the target camera movement mode is the pull-out lens, the preset regions in the plurality of first images include a transition from a third subset of the main subjects to a fourth subset of the main subjects in the time sequence, where the fourth subset of the main subjects includes the third subset of the main subjects, the fourth subset of the main subjects is all or some of the main subjects, and the third subset of the main subjects is some of the main subjects.

Optionally, in a feasible embodiment, when the target camera movement mode is the follow lens, the traveling lens, or the panning lens, the fusing the plurality of first images, the plurality of second images, and a plurality of sixth images based on the target camera movement mode, to obtain the target video includes:

performing subject detection and extraction on the plurality of first images to obtain an ROI in each of the plurality of first images; obtaining a plurality of fourth image pairs from the plurality of first images, the plurality of second images, and the plurality of sixth images, where each of the plurality of fourth image pairs includes a first image, a second image, and a sixth image that have a same timestamp; obtaining a plurality of fourth target images from the plurality of fourth image pairs, where the plurality of fourth target images are in a one-to-one correspondence with the plurality of fourth image pairs, and each of the plurality of fourth target images is an image that has a smallest viewing angle range in a corresponding fourth image pair and that includes an ROI in the first image; cutting each of the plurality of fourth target images to obtain a part that overlaps an image in an ROI in a first image in a fourth image pair to which the fourth target image belongs, to obtain a plurality of ninth images; and processing each of the plurality of ninth images to obtain a plurality of tenth images, where a resolution of each of the plurality of tenth images is a preset resolution, and the target video includes the plurality of tenth images.

Figure 11B:
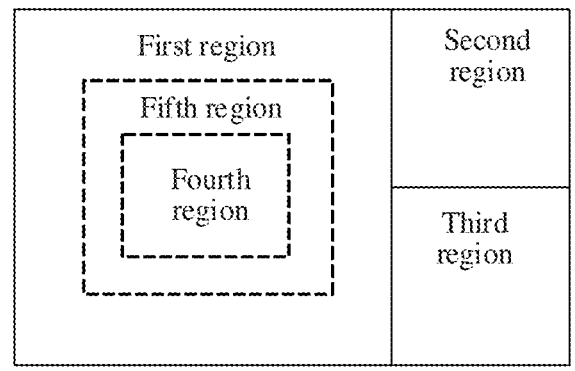
FIG. 11b is a schematic diagram of another display interface according to an embodiment of the present disclosure.

Further, as shown in FIG. 11b, the display interface includes a first region, a second region, and a third region, the first region includes a fifth region, and the fifth region includes a fourth region; and the first region displays the image captured by the first camera, the second region is used to display the image captured by the second camera, the third region is used to display the target video, the fourth region is used to display an overlapping part between the image captured by the first camera and the image captured by the second camera, and the fifth region is used to display an overlapping part between the image captured by the second camera and the image captured by the third camera.

In a feasible embodiment, after the determining the main subject in the first image, the method in the present disclosure includes the following steps.

The main control device obtains a real-time position of a main subject by using a target tracking technology; and adjusts framing ranges of the first camera, the second camera, and/or the third camera based on the real-time position of the main subject, so that the first camera, the second camera, and/or the third camera acquire/acquires images including the main subject in real time.

For example, when it is determined, based on the real-time position of the main subject, that the main subject is to leave a photographing range of a telephoto camera, a focal length of a telephoto lens is controlled to become small, so that the framing range of the telephoto lens becomes large.

Optionally, a wide-angle camera and a primary camera are opened according to a specific opening rule. For example, the wide-angle camera is closed when the main subject is within a viewing angle range of the primary camera; and the primary camera is closed and the wide-angle camera is opened when the main subject is not within the viewing angle range of the primary camera.

In a feasible embodiment, the adjusting a framing range of the lens may also be sending a prompt message to a user to prompt the user to manually adjust the framing range of the lens, so as to ensure that the determined main subject is always within the framing range of the lens.

Optionally, the prompt message may be a voice message, or may be a text message displayed on the main control device, or a message in another form.

It can be learned that in embodiments of the present disclosure, the target camera movement mode is determined based on main subject information in images captured by the first camera and motion information of the camera, and then images captured by a plurality of cameras (which include the first camera, the second camera, and the like) are fused based on the target camera movement mode, to obtain a target video having a visual effect of a video obtained in the target camera movement mode. In the present disclosure, instead of performing output after image frames of each video stream are subject to simple transition or sorting, a video having characteristics of a prominent subject, a clean background, and smooth transition is outputted after the image frames of each video stream are edited, modified, and fused by combining the main subject information and the motion information, to help a user create a high-quality video with good imaging quality, the prominent subject, the clean background, and harmonious camera movement online through a mobile phone for subsequent sharing.

The following describes a specific structure of the main control device in detail.

Figure 12:
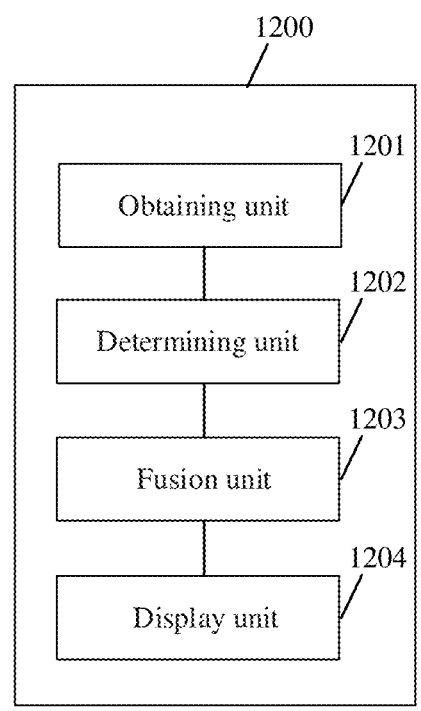
FIG. 12 is a schematic diagram of a structure of a main control device according to an embodiment of the present disclosure.

FIG. 12 is a schematic diagram of a structure of a main control device according to an embodiment of the present disclosure. As shown in FIG. 12, the main control device 1200 includes: an obtaining unit 1201, configured to obtain a plurality of first images and a plurality of second images, where the plurality of first images and the plurality of second images are respectively obtained through photographing a same photographed object by using a first camera and a second camera, and a parameter of the first camera is different from a parameter of the second camera; and obtain motion information of the first camera in a process of obtaining the plurality of first images through photographing;

the obtaining unit 1201 being further configured to obtain main subject information in each of the plurality of first images;

a determining unit 1202, configured to determine a target camera movement mode based on the motion information of the first camera and the main subject information in each of the plurality of first images; and a fusion unit 1203, configured to fuse the plurality of first images and the plurality of second images based on the target camera movement mode, to obtain a target video, where a camera movement effect of the target video is the same as a camera movement effect of a video obtained in the target camera movement mode.

In a feasible embodiment, the determining unit 1202 is further configured to:

determine, based on the motion information of the first camera, whether the first camera is displaced in the process of obtaining the plurality of first images through photographing; determine, when it is determined that the first camera is not displaced, the target camera movement mode based on the main subject information in each of the plurality of first images; and determine, when it is determined that the first camera is displaced, the target camera movement mode based on a motion manner of the first camera and the main subject information in each of the plurality of first images.

In a feasible embodiment, in an aspect of determining the target camera movement mode based on a motion manner of the first camera and the main subject information in each of the plurality of first images, the determining unit 1202 is further configured to:

determine the target camera movement mode as a push-in lens when the main subject information in each of the plurality of first images indicates that each of the plurality of first images includes a main subject, and a first ratio of each of the plurality of first images is less than a first preset ratio, where the first ratio of each first image is a ratio of an area of a region of interest (ROI) in which the main subject in the first image is located to an area of the first image; or the first ratio of each first image is a ratio of a width of an ROI in which the main subject in the first image is located to a width of the first image; or the first ratio of each first image is a ratio of a height of an ROI in which the main subject in the first image is located to a height of the first image; and determine the target camera movement mode as a pull-out lens when the main subject information in each of the plurality of first images indicates that a default ROI region in each first image does not include the main subject, and an image in the default ROI in each first image is a part of the first image.

In a feasible embodiment, in an aspect of determining the target camera movement mode based on a motion manner of the first camera and the main subject information in each of the plurality of first images, the determining unit 1202 is further configured to:

determine the target camera movement mode as a traveling lens when the motion manner of the first camera indicates that the first camera moves in a same direction when obtaining the plurality of first images through photographing, and the main subject information in each of the plurality of first images indicates that main subjects in the plurality of first images change;

determine the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and determine the target camera movement mode as a follow lens when the motion manner of the first camera indicates that the first camera moves when obtaining the plurality of first images through photographing, and the main subject information in each of the plurality of first images indicates that the main subjects in the plurality of first images do not change.

In a feasible embodiment, when the target camera movement mode is the push-in lens or the pull-out lens, the fusion unit 1203 is further configured to:

obtain a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtain a plurality of first image pairs from the plurality of first images and the plurality of second images, where each of the plurality of first image pairs includes a first image and a second image that have a same timestamp; obtain a plurality of first target images from the plurality of first image pairs, where the plurality of first target images are in a one-to-one correspondence with the plurality of first image pairs, and each of the plurality of first target images is an image that has a smallest viewing angle range in a corresponding first image pair and that includes a preset region in the first image; cut each of the plurality of first target images to obtain a part that overlaps an image in a preset region in a first image in a second image pair to which the first target image belongs, to obtain a plurality of third images; and process each of the plurality of third images to obtain a plurality of processed third images, where a resolution of each of the plurality of processed third images is a preset resolution, and the target video includes the plurality of processed third images.

In a feasible embodiment, when the target camera movement mode is the traveling lens, the panning lens, or the follow lens, the fusion unit 1203 is further configured to:

perform subject detection and extraction on the plurality of first images to obtain an ROI in each of the plurality of first images, and cut the ROI in each of the plurality of first images to obtain a plurality of fourth images, where each of the plurality of fourth images includes a main subject; and the plurality of first images are in a one-to-one correspondence with the plurality of fourth images, and a timestamp of each of the plurality of fourth images is the same as a timestamp of a first image corresponding to the fourth image; process each of the plurality of fourth images to obtain a plurality of fifth images, where a resolution of each of the plurality of fifth images is a preset resolution; and the plurality of fourth images are in a one-to-one correspondence with the plurality of fifth images, and a timestamp of each of the plurality of fifth images is the same as a timestamp of a fourth image corresponding to the fifth image; obtain a plurality of second image pairs from the plurality of second images and the plurality of fifth images, where each of the plurality of second image pairs includes a fifth image and a second image that have a same timestamp; and obtain a plurality of second target images from the plurality of second image pairs, where the plurality of second target images are in a one-to-one correspondence with the plurality of image pairs; for each of the plurality of second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the second target image corresponding to the image pair is the fifth image; and the target video includes the plurality of second target images.

In a feasible embodiment, the main control device 1200 further includes:

a display unit 1204, configured to display an image captured by the first camera, an image captured by the second camera, and the target video, where an interface displayed by the display unit 1204 includes a first region, a second region, and a third region, the first region displays the image captured by the first camera, the second region is used to display the image captured by the second camera, the third region is used to display the target video, and a field of view (FOV) of the first camera is greater than an FOV of the second camera.

Optionally, the first camera is a wide-angle camera or a primary camera, and the second camera is a telephoto camera or a primary camera.

Further, the first region includes a fourth region, and the fourth region is used to display an overlapping part between the image captured by the first camera and the image captured by the second camera.

In a feasible embodiment, the fusion unit 1203 is further configured to:

fuse the plurality of first images, the plurality of second images, and a plurality of sixth images based on the target camera movement mode, to obtain the target video, where the sixth image is obtained through photographing the photographed object by using a third camera, a parameter of the third camera is different from the parameter of the first camera, and the parameter of the third camera is different from the parameter of the second camera.

In a feasible embodiment, when the target camera movement mode is the push-in lens or the pull-out lens, the fusion unit 1203 is further configured to:

obtain a preset region in each of the plurality of first images, where the preset region in each of the plurality of first images includes the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence; obtain a plurality of third image pairs from the plurality of first images, the plurality of second images, and the plurality of sixth images, where each of the plurality of third image pairs includes a first image, a second image, and a sixth image that have a same timestamp; obtain a plurality of third target images from the plurality of third image pairs, where the plurality of third target images are in a one-to-one correspondence with the plurality of third image pairs, and each of the plurality of third target images is an image that has a smallest viewing angle range in a corresponding third image pair and that includes a preset region in the first image; cut each of the plurality of third target images to obtain a part that overlaps an image in a preset region in a first image in a third image pair to which the third target image belongs, to obtain a plurality of seventh images; and process each of the plurality of seventh images to obtain a plurality of eighth images, where a resolution of each of the plurality of eighth images is a preset resolution, and the target video includes the plurality of eighth images.

In a feasible embodiment, when the target camera movement mode is the follow lens, the traveling lens, or the panning lens, the fusion unit 1203 is further configured to:

perform subject detection and extraction on the plurality of first images to obtain an ROI in each of the plurality of first images; obtain a plurality of fourth image pairs from the plurality of first images, the plurality of second images, and the plurality of sixth images, where each of the plurality of fourth image pairs includes a first image, a second image, and a sixth image that have a same timestamp; obtain a plurality of fourth target images from the plurality of fourth image pairs, where the plurality of fourth target images are in a one-to-one correspondence with the plurality of fourth image pairs, and each of the plurality of fourth target images is an image that has a smallest viewing angle range in a corresponding fourth image pair and that includes an ROI in the first image; cut each of the plurality of fourth target images to obtain a part that overlaps an image in an ROI in a first image in a fourth image pair to which the fourth target image belongs, to obtain a plurality of ninth images; and process each of the plurality of ninth images to obtain a plurality of tenth images, where a resolution of each of the plurality of tenth images is a preset resolution, and the target video includes the plurality of tenth images.

In a feasible embodiment, the main control device 1200 further includes:

a display unit 1204, configured to display an image captured by the first camera, an image captured by the second camera, an image captured by the third camera, and the target video, where the FOV of the first camera is greater than the FOV of the second camera, and an FOV of the third camera is greater than the FOV of the second camera and less than the FOV of the first camera, and an interface displayed by the display unit 1204 includes a first region, a second region, and a third region, the first region includes a fifth region, and the fifth region includes a fourth region, the first region displays the image captured by the first camera, the second region is used to display the image captured by the second camera, the third region is used to display the target video, and the fourth region is used to display an overlapping part between the image captured by the first camera and the image captured by the second camera; and the fifth region is used to display an overlapping part between the image captured by the second camera and the image captured by the third camera.

It should be noted that the foregoing units (the obtaining unit 1201, the determining unit 1202, the fusion unit 1203, and the display unit 1204) are configured to perform related steps in the foregoing method. For example, the obtaining unit 1201 is configured to perform related content of step S301 and step S302, the determining unit is configured to perform related content of S302, and the fusion unit 1203 and the display unit 1204 are configured to perform related content of S304.

In this embodiment, the main control device 1200 is presented in the form of a unit. The "unit" herein may be an application-specific integrated circuit (ASIC), a processor and a memory that execute one or more software or firmware programs, an integrated logic circuit, and/or another device that can provide the foregoing functions. In addition, the obtaining unit 1201, the determining unit 1202, and the fusion unit 1203 may be implemented by using a processor 1401 of the main control device shown in FIG. 14.

Figure 13:
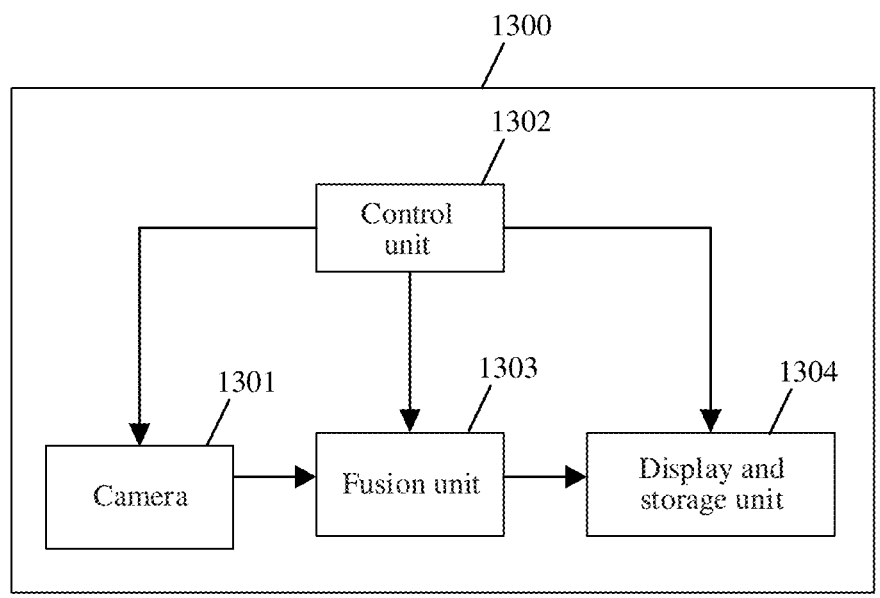
FIG. 13 is a schematic diagram of a structure of another main control device according to an embodiment of the present disclosure.

FIG. 13 is a schematic diagram of another structure of a main control device according to an embodiment of the present disclosure. As shown in FIG. 13, the main control device 1300 includes:

a camera 1301, configured to obtain a plurality of first images and a plurality of second images, where the camera 1301 includes a first camera and a second camera, the plurality of first images and the plurality of second images are respectively obtained through photographing a same photographed object by using the first camera and the second camera, and an FOV of the first camera is greater than an FOV of the second camera;

a control unit 1302, configured to obtain motion information of the first camera in a process of obtaining the plurality of first images through photographing; obtain main subject information in each of the plurality of first images; and determine a target camera movement mode based on the motion information of the first camera and the main subject information in each of the plurality of first images;

a fusion unit 1303, configured to fuse the plurality of first images and the plurality of second images based on the target camera movement mode, to obtain a target video, where a camera movement effect of the target video is the same as a camera movement effect of a video obtained in the target camera movement mode; and a display and storage unit 1304, configured to display and store the first images, the second images, and the target video.

Optionally, the camera 1301 further includes a third camera, an FOV of the third camera is greater than the FOV of the second camera and less than the FOV of the first camera, and the third camera obtains a plurality of third images by photographing the photographed object.

The fusion unit 1303 is configured to fuse the plurality of first images, the plurality of second images, and the plurality of third images based on the target camera movement mode, to obtain the target video.

The display and storage unit 1304 is further configured to display and store the third images.

It should be noted herein that, for specific implementation processes of the camera 1301, the control unit 1302, the fusion unit 1303, and the display and storage unit 1304, refer to related descriptions of step S301 to step S304.

Figure 14:
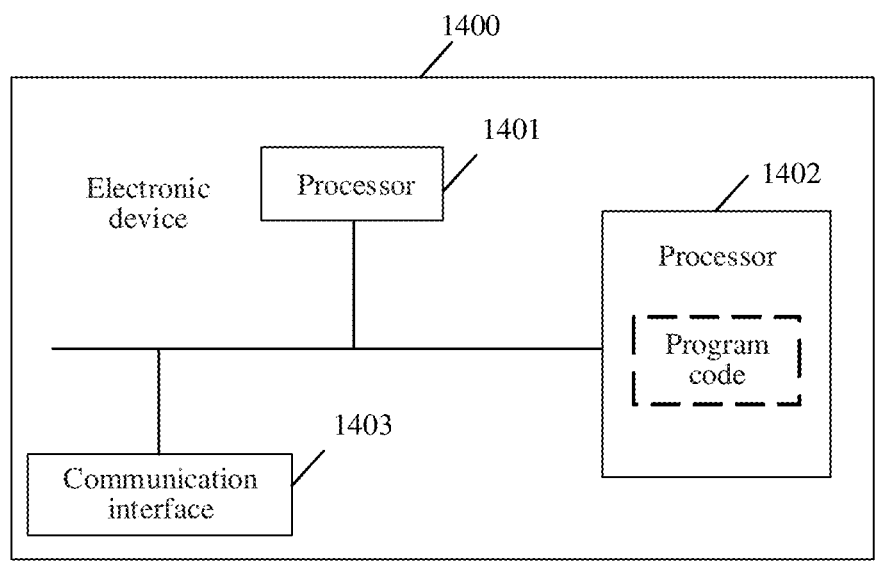
FIG. 14 is a schematic diagram of a structure of another main control device according to an embodiment of the present disclosure.

As shown in FIG. 14, a main control device 1400 may be implemented by using the structure shown in FIG. 12. The main control device 1400 includes at least one processor 1401, at least one memory 1402, and at least one communication interface 1403. The processor 1401, the memory 1402, and the communication interface 1403 are connected and communicate with each other by using a communication bus.

The processor 1401 may be a general-purpose central processing unit (CPU), a microprocessor, an application-specific integrated circuit (ASIC), or one or more integrated circuits configured to control program execution in the foregoing solution.

The communication interface 1403 is configured to communicate with another device or a communication network, such as an Ethernet, a radio access network (RAN), or a wireless local area network (WLAN).

The memory 1402 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, and the like), a magnetic disk storage medium or another magnetic storage device, or any other medium that can be used to carry or store expected program code in a form of instructions or a data structure and can be accessed by a computer. The memory may exist independently, and is connected to the processor through the bus. The memory may alternatively be integrated with the processor.

The memory 1402 is configured to store application program code for executing the foregoing solution, and the execution is controlled by the processor 1401. The processor 1401 is configured to execute the application program code stored in the memory 1402.

The code stored in the memory 1402 may execute the multi-lens video recording method provided above, for example:

obtaining a plurality of first images and a plurality of second images, where the plurality of first images and the plurality of second images are respectively obtained through photographing a same photographed object by using a first camera and a second camera, and a parameter of the first camera is different from a parameter of the second camera; obtaining motion information of the first camera in a process of obtaining the plurality of first images through photographing; obtaining main subject information in each of the plurality of first images; determining a target camera movement mode based on the motion information of the first camera and the main subject information in each of the plurality of first images; and fusing the plurality of first images and the plurality of second images based on the target camera movement mode, to obtain a target video, where a camera movement effect of the target video is the same as a camera movement effect of a video obtained in the target camera movement mode.

Optionally, the main control device 1400 further includes a display, configured to display the first images, the second images, and the target video. Because the display is optional, it is not shown in FIG. 14.

An embodiment of the present disclosure further provides a computer storage medium. The computer storage medium may store a program. When being executed, the program includes some or all steps of any multi-lens video recording method that is set forth in the foregoing method embodiments.

It should be noted that, for brief description, the foregoing method embodiments are represented as a series of actions. However, a person skilled in the art should appreciate that the present disclosure is not limited to the described order of the actions, because according to the present disclosure, some steps may be performed in other orders or simultaneously. It should be further appreciated by a person skilled in the art that the embodiments described in this specification all belong to preferred embodiments, and the actions and modules in the embodiments are not necessarily required by the present disclosure.

In the foregoing embodiments, the description of each embodiment has respective focuses. For a part that is not described in detail in an embodiment, refer to related descriptions in other embodiments.

In the several embodiments provided in the present disclosure, it should be understood that the disclosed apparatus may be implemented in other manners. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of the present disclosure may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present disclosure essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in embodiments of the present disclosure. The foregoing storage medium includes any medium that can store program code, such as a USB flash drive, a read-only memory (ROM), a random access memory (RAM), a removable hard disk, a magnetic disk, or an optical disc.

A person of ordinary skill in the art may understand that all or some of the steps of the methods in embodiments may be implemented by a program instructing related hardware. The program may be stored in a computer-readable memory. The memory may include a flash memory, a read-only memory (ROM), a random access memory (RAM), a magnetic disk, an optical disc, or the like.

In conclusion, the foregoing embodiments are merely intended for describing the technical solutions of the present disclosure, but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the scope of the technical solutions of embodiments of the present disclosure.

What is claimed is:

1. A multi-lens video recording method, comprising:
obtaining a plurality of first images and a plurality of second images, wherein the plurality of first images and the plurality of second images are respectively obtained through photographing a same photographed object by using a first camera and a second camera, and at least one parameter is different between the first camera and the second camera;
obtaining motion information of the first camera in a process of obtaining the plurality of first images through photographing;
obtaining main subject information in each of the plurality of first images;
determining a target camera movement mode based on the motion information of the first camera and the main subject information in each of the plurality of first images; and
fusing the plurality of first images and the plurality of second images based on the target camera movement mode, to obtain the target video,
wherein the determining a target camera movement mode based on the motion information of the first camera and the main subject information in each of the plurality of first images comprises:
determining, based on the motion information of the first camera, whether the first camera is displaced in the process of obtaining the plurality of first images;
determining the target camera movement mode based on the main subject information in each of the plurality of the first images after determining that the first camera is not displaced; and
determining the target camera movement mode based on a motion manner of the first camera and the main subject information in each of the plurality of first images after determining that the first camera is displaced.

2. The method according to claim 1, wherein
a field of view (FOV) of the first camera is greater than an FOV of the second camera; or
a focal length of the first camera is less than a focal length of the second camera.

3. The method according to claim 1, wherein the determining the target camera movement mode based on the main subject information in each of the plurality of first images comprises:
determining the target camera movement mode as a push-in lens when the main subject information in each of the plurality of first images indicates that each of the plurality of first images comprises a main subject, and a first ratio of each of the plurality of first images is less than a first preset ratio, wherein the first ratio of each first image is a ratio of an area of a region of interest (ROI) in which the main subject in the first image is located to an area of the first image; or the first ratio of each first image is a ratio of a width of an ROI in which the main subject in the first image is located to a width of the first image; or the first ratio of each first image is a ratio of a height of an ROI in which the main subject in the first image is located to a height of the first image; and
determining the target camera movement mode as a pull-out lens when the main subject information in each of the plurality of first images indicates that a default ROI region in each first image does not comprise the main subject, and an image in the default ROI in each first image is a part of the first image.

4. The method according to claim 1, wherein the determining the target camera movement mode based on a motion manner of the first camera and the main subject information in each of the plurality of first images comprises:
determining the target camera movement mode as a traveling lens when the motion manner of the first camera indicates that the first camera moves in a same direction when obtaining the plurality of first images, and the main subject information in each of the plurality of first images indicates that main subjects in the plurality of first images change;
determining the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and
determining the target camera movement mode as a follow lens when the motion manner of the first camera indicates that the first camera moves when obtaining the plurality of first images, and the main subject information in each of the plurality of first images indicates that the main subjects in the plurality of first images do not change.

5. The method according to claim 3, wherein when the target camera movement mode is the push-in lens or the pull-out lens, the fusing the plurality of first images and the plurality of second images based on the target camera movement mode, to obtain the target video comprises:
obtaining a preset region in each of the plurality of first images, wherein the preset region in each of the plurality of first images comprises the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence;
obtaining a plurality of first image pairs from the plurality of first images and the plurality of second images, wherein each of the plurality of first image pairs comprises a first image and a second image that have a same timestamp;
obtaining a plurality of first target images from the plurality of first image pairs, wherein the plurality of first target images is in a one-to-one correspondence with the plurality of first image pairs, and each of the plurality of first target images is an image that has a smallest viewing angle range in a corresponding first image pair and that comprises a preset region in the first image;
cutting each of the plurality of first target images to obtain a part that overlaps an image in a preset region in a first image in a second image pair to which the first target image belongs, to obtain a plurality of third images; and
processing each of the plurality of third images to obtain a plurality of processed third images, wherein a resolution of each of the plurality of processed third images is a preset resolution, and
the target video comprises the plurality of processed third images.

6. The method according to claim 4, wherein when the target camera movement mode is the traveling lens, the panning lens, or the follow lens, the fusing the plurality of first images and the plurality of second images based on the target camera movement mode, to obtain the target video comprises:
performing subject detection and extraction on the plurality of first images to obtain an ROI in each of the plurality of first images, and cutting the ROI in each of the plurality of first images to obtain a plurality of fourth images, wherein each of the plurality of fourth images comprises a main subject; and the plurality of first images are in a one-to-one correspondence with the plurality of fourth images, and a timestamp of each of the plurality of fourth images is the same as a timestamp of a first image corresponding to the fourth image;
processing each of the plurality of fourth images to obtain a plurality of fifth images, wherein a resolution of each of the plurality of fifth images is a preset resolution; and the plurality of fourth images are in a one-to-one correspondence with the plurality of fifth images, and a timestamp of each of the plurality of fifth images is the same as a timestamp of a fourth image corresponding to the fifth image;
obtaining a plurality of second image pairs from the plurality of second images and the plurality of fifth images, wherein each of the plurality of second image pairs comprises a fifth image and a second image that have a same timestamp; and
obtaining a plurality of second target images from the plurality of second image pairs, wherein the plurality of second target images are in a one-to-one correspondence with the plurality of second image pairs; for each of the plurality of second image pairs, when content of a fifth image in the second image pair overlaps content of a second image in the second image pair, a second target image corresponding to the second image pair is the second image; and when the content of the fifth image in the second image pair does not overlap the content of the second image in the second image pair, the second target image corresponding to the second image pair is the fifth image; and
the target video comprises the plurality of second target images.

7. The method according to claim 1, further comprising:
displaying an image captured by the first camera, an image captured by the second camera, and the target video on a display interface, wherein
the display interface comprises a first region, a second region, and a third region, the first region for displaying the image captured by the first camera, the second region for displaying the image captured by the second camera, and the third region for displaying the target video.

8. The method according to claim 7, wherein the first region comprises a fourth region, and the fourth region for displaying an overlapping part between the image captured by the first camera and the image captured by the second camera.

9. The method according to claim 1, wherein the fusing the plurality of first images and the plurality of second images based on the target camera movement mode, to obtain the target video comprises:

fusing the plurality of first images, the plurality of second images, and a plurality of sixth images based on the target camera movement mode, to obtain the target video, wherein the sixth image is obtained through photographing the photographed object by using a third camera, a parameter of the third camera is different from the parameter of the first camera, and the parameter of the third camera is different from the parameter of the second camera.

10. The method according to claim 9, wherein when the target camera movement mode is a push-in lens or a pull-out lens, the fusing the plurality of first images, the plurality of second images, and a plurality of sixth images based on the target camera movement mode, to obtain the target video comprises:

obtaining a preset region in each of the plurality of first images, wherein the preset region in each of the plurality of first images comprises the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence;

obtaining a plurality of third image pairs from the plurality of first images, the plurality of second images, and the plurality of sixth images, wherein each of the plurality of third image pairs comprises a first image, a second image, and a sixth image that have a same timestamp;

obtaining a plurality of third target images from the plurality of third image pairs, wherein the plurality of third target images is in a one-to-one correspondence with the plurality of third image pairs, and each of the plurality of third target images is an image that has a smallest viewing angle range in a corresponding third image pair and that comprises a preset region in the first image;

cutting each of the plurality of third target images to obtain a part that overlaps an image in a preset region in a first image in a third image pair to which the third target image belongs, to obtain a plurality of seventh images; and processing each of the plurality of seventh images to obtain a plurality of eighth images, wherein a resolution of each of the plurality of eighth images is a preset resolution, and the target video comprises the plurality of eighth images.

11. The method according to claim 9, wherein when the target camera movement mode is a follow lens, a traveling lens, or a panning lens, the fusing the plurality of first images, the plurality of second images, and a plurality of sixth images based on the target camera movement mode, to obtain the target video comprises:

performing subject detection and extraction on the plurality of first images to obtain an ROI in each of the plurality of first images;

obtaining a plurality of fourth image pairs from the plurality of first images, the plurality of second images, and the plurality of sixth images, wherein each of the plurality of fourth image pairs comprises a first image, a second image, and a sixth image that have a same timestamp;

obtaining a plurality of fourth target images from the plurality of fourth image pairs, wherein the plurality of fourth target images is in a one-to-one correspondence with the plurality of fourth image pairs, and each of the plurality of fourth target images is an image that has a smallest viewing angle range in a corresponding fourth image pair and that comprises an ROI in the first image;

cutting each of the plurality of fourth target images to obtain a part that overlaps an image in an ROI in a first image in a fourth image pair to which the fourth target image belongs, to obtain a plurality of ninth images; and processing each of the plurality of ninth images to obtain a plurality of tenth images, wherein a resolution of each of the plurality of tenth images is a preset resolution, and the target video comprises the plurality of tenth images.

12. The method according to claim 1, further comprising:

displaying an image captured by the first camera, an image captured by the second camera, an image captured by a third camera, and the target video on a display interface, wherein the display interface comprises a first region, a second region, and a third region, the first region comprises a fifth region, and the fifth region comprises a fourth region; and the first region for displaying the image captured by the first camera, the second region for displaying the image captured by the second camera, the third region for displaying the target video, the fourth region for displaying an overlapping part between the image captured by the first camera and the image captured by the second camera, and the fifth region for displaying an overlapping part between the image captured by the second camera and the image captured by the third camera.

13. A main control device, comprising at least one processor and at least one memory including instructions that, when executed by the at least one processor, cause the main control device to perform operations comprising:

obtaining a plurality of first images and a plurality of second images, wherein the plurality of first images and the plurality of second images are respectively obtained through photographing a same photographed object by using a first camera and a second camera, and at least one parameter is different between the first camera and the second camera;

obtaining motion information of the first camera in a process of obtaining the plurality of first images through photographing;

obtaining main subject information in each of the plurality of first images;

a determination operation including determining a target camera movement mode based on the motion information of the first camera and the main subject information in each of the plurality of first images; and a fusion operation including fusing the plurality of first images and the plurality of second images based on the target camera movement mode, to obtain the target video, wherein the determination operation further comprises:

determining, based on the motion information of the first camera, whether the first camera is displaced in the process of obtaining the plurality of first images;

determining the target camera movement mode based on the main subject information in each of the plurality of first images after determining that the first camera is not displaced; and determining the target camera movement mode based on a motion manner of the first camera and the main subject information in each of the plurality of first images after determining that the first camera is displaced.

14. The device according to claim 13, wherein
a field of view (FOV) of the first camera is greater than an FOV of the second camera; or
a focal length of the first camera is less than a focal length of the second camera.

15. The device according to claim 13, wherein in determining the target camera movement mode based on the main subject information in each of the plurality of first images, the determination operation further comprises:
determining the target camera movement mode as a push-in lens when the main subject information in each of the plurality of first images indicates that each of the plurality of first images comprises a main subject, and a first ratio of each of the plurality of first images is less than a first preset ratio, wherein the first ratio of each first image is a ratio of an area of a region of interest (ROI) in which the main subject in the first image is located to an area of the first image; or the first ratio of each first image is a ratio of a width of an ROI in which the main subject in the first image is located to a width of the first image; or the first ratio of each first image is a ratio of a height of an ROI in which the main subject in the first image is located to a height of the first image; and
determining the target camera movement mode as a pull-out lens when the main subject information in each of the plurality of first images indicates that a default ROI region in each first image does not comprise the main subject, and an image in the default ROI in each first image is a part of the first image.

16. The device according to claim 13, wherein in determining the target camera movement mode based on a motion manner of the first camera and the main subject information in each of the plurality of first images, the determination operation further comprises:
determining the target camera movement mode as a traveling lens when the motion manner of the first camera indicates that the first camera moves in a same direction when obtaining the plurality of first images, and the main subject information in each of the plurality of first images indicates that main subjects in the plurality of first images change;
determining the target camera movement mode as a panning lens when the motion manner of the first camera indicates that the first camera performs a reciprocating motion in two opposite directions when obtaining the plurality of first images through photographing, and the main subject information in each of the plurality of first images indicates that the main subjects in the plurality of first images change; and
determining the target camera movement mode as a follow lens when the motion manner of the first camera indicates that the first camera moves when obtaining the plurality of first images, and the main subject information in each of the plurality of first images indicates that the main subjects in the plurality of first images do not change.

17. The device according to claim 15, wherein when the target camera movement mode is the push-in lens or the pull-out lens, the fusion operation further comprises:
obtaining a preset region in each of the plurality of first images, wherein the preset region in each of the plurality of first images comprises the main subject, and when the target camera movement mode is the push-in lens, sizes of the preset regions in the plurality of first images are gradually reduced in a time sequence; and when the target camera movement mode is the pull-out lens, the sizes of the preset regions in the plurality of first images gradually increase in the time sequence;
obtaining a plurality of first image pairs from the plurality of first images and the plurality of second images, wherein each of the plurality of first image pairs comprises a first image and a second image that have a same timestamp;
obtaining a plurality of first target images from the plurality of first image pairs, wherein the plurality of first target images is in a one-to-one correspondence with the plurality of first image pairs, and each of the plurality of first target images is an image that has a smallest viewing angle range in a corresponding first image pair and that comprises a preset region in the first image;
cutting each of the plurality of first target images to obtain a part that overlaps an image in a preset region in a first image in a second image pair to which the first target image belongs, to obtain a plurality of third images; and
processing each of the plurality of third images to obtain a plurality of processed third images, wherein a resolution of each of the plurality of processed third images is a preset resolution, and
the target video comprises the plurality of processed third images.

18. A computer storage medium, comprising computer instructions, wherein when the computer instructions run on an electronic device, the electronic device is enabled to perform operations comprising:
obtaining a plurality of first images and a plurality of second images, wherein the plurality of first images and the plurality of second images are respectively obtained through photographing a same photographed object by using a first camera and a second camera, and at least one parameter is different between the first camera and the second camera;
obtaining motion information of the first camera in a process of obtaining the plurality of first images through photographing;
obtaining main subject information in each of the plurality of first images;
determining a target camera movement mode based on the motion information of the first camera and the main subject information in each of the plurality of first images; and
fusing the plurality of first images and the plurality of second images based on the target camera movement mode, to obtain the target video,
wherein the determining a target camera movement mode based on the motion information of the first camera and the main subject information in each of the plurality of first images comprises:
determining, based on the motion information of the first camera, whether the first camera is displaced in the process of obtaining the plurality of first images;
determining the target camera movement mode based on the main subject information in each of the plurality of first images after determining that the first camera is not displaced; and
determining the target camera movement mode based on a motion manner of the first camera and the main subject information in each of the plurality of first images after determining that the first camera is displaced.

\* \* \* \* \*

UNITED STATES PATENT AND TRADEMARK OFFICE
CERTIFICATE OF CORRECTION

Page 1 of 1

PATENT NO. : 12,382,172 B2
APPLICATION NO. : 18/189319
DATED : August 5, 2025
INVENTOR(S) : Fei Teng et al.

It is certified that error appears in the above-identified patent and that said Letters Patent is hereby corrected as shown below:

In the Specification

Column 17, Line 27, change, "Nis" to --N is--.

Signed and Sealed this
Sixteenth Day of September, 2025

Coke Morgan Stewart
*Acting Director of the United States Patent and Trademark Office*